US006985916B2

(12) United States Patent
Carlson et al.

(10) Patent No.: US 6,985,916 B2
(45) Date of Patent: *Jan. 10, 2006

(54) METHOD, SYSTEM, AND ARTICLE OF MANUFACTURE FOR RETURNING PHYSICAL VOLUMES

(75) Inventors: Wayne Charles Carlson, Tucson, AZ (US); Kevin Lee Gibble, Tucson, AZ (US); Gregory Tad Kishi, Oro Valley, AZ (US); Mark Allan Norman, Tucson, AZ (US); Jonathan Wayne Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 437 days.

This patent is subject to a terminal disclaimer.

(21) Appl. No.: 10/230,522

(22) Filed: Aug. 29, 2002

(65) Prior Publication Data

US 2004/0044852 A1 Mar. 4, 2004

(51) Int. Cl.
*G06F 12/00* (2006.01)
(52) U.S. Cl. .................. 707/205; 710/56; 711/154; 711/170; 711/111; 711/4
(58) Field of Classification Search .......... 707/205, 707/206; 710/56, 40, 57; 711/154, 159, 711/170, 111, 112, 113, 4
See application file for complete search history.

(56) References Cited

U.S. PATENT DOCUMENTS

| 4,530,055 A | | 7/1985 | Hamstra et al. | |
| 4,811,216 A | * | 3/1989 | Bishop et al. | 711/153 |
| 5,043,885 A | | 8/1991 | Robinson | |
| 5,109,336 A | * | 4/1992 | Guenther et al. | 711/171 |
| 5,164,909 A | | 11/1992 | Leonhardt et al. | |
| 5,193,171 A | * | 3/1993 | Shinmura et al. | 711/113 |
| 5,247,674 A | * | 9/1993 | Kogure | 711/170 |
| 5,253,351 A | | 10/1993 | Yamamoto et al. | |
| 5,390,318 A | | 2/1995 | Ramakrishnan et al. | |
| 5,412,780 A | | 5/1995 | Rushton | |
| 5,463,776 A | * | 10/1995 | Voigt et al. | 707/101 |
| 5,546,557 A | | 8/1996 | Allen et al. | |
| 5,551,003 A | * | 8/1996 | Mattson et al. | 711/136 |
| 5,561,786 A | * | 10/1996 | Morse | 711/170 |
| 5,623,654 A | * | 4/1997 | Peterman | 707/206 |
| 5,636,355 A | | 6/1997 | Ramakrishnan et al. | |
| 5,652,864 A | * | 7/1997 | Hine | 711/171 |
| 5,727,185 A | * | 3/1998 | Mehner | 711/170 |
| 5,790,828 A | | 8/1998 | Jost | |
| 5,829,023 A | | 10/1998 | Bishop | |
| 5,926,834 A | | 7/1999 | Carlson et al. | |

(Continued)

OTHER PUBLICATIONS

U.S. Appl. No. 10/230,612, filed Aug. 29, 2002, entitled "Method, System, and Program for Transferring Data", by inventors K.L. Gibble et al.

(Continued)

*Primary Examiner*—Hong Kim
(74) *Attorney, Agent, or Firm*—Rabindranath Dutta; Konrad Raynes & Victor LLP

(57) ABSTRACT

Provided are a method, system and article of manufacture for return processing in storage pools. A plurality of physical volumes are allocated to a first storage pool. A determination is made whether the first storage pool has more than a threshold number of empty physical volumes. If the first storage pool has more than the threshold number of empty physical volumes, then at least one empty physical volume is returned to a second storage pool.

18 Claims, 14 Drawing Sheets

U.S. PATENT DOCUMENTS

| | | | |
|---|---|---|---|
| 5,956,301 A | | 9/1999 | Dimitri et al. |
| 5,978,893 A | * | 11/1999 | Bakshi et al. ............... 711/171 |
| 6,023,712 A | * | 2/2000 | Spear et al. ............... 707/205 |
| 6,038,490 A | | 3/2000 | Dimitri et al. |
| 6,067,599 A | | 5/2000 | Kishi et al. |
| 6,163,773 A | | 12/2000 | Kishi |
| 6,304,880 B1 | | 10/2001 | Kishi |
| 6,336,163 B1 | | 1/2002 | Brewer et al. |
| 6,339,778 B1 | | 1/2002 | Kishi |
| 6,351,685 B1 | | 2/2002 | Dimitri et al. |
| 6,591,334 B1 | * | 7/2003 | Shyam et al. ............... 711/112 |
| 2001/0001870 A1 | | 5/2001 | Ofek et al. |
| 2004/0044855 A1 | * | 3/2004 | Carlson et al. ............. 711/154 |

OTHER PUBLICATIONS

U.S. Appl. No. 10/230,936, filed Aug. 29, 2002, entitled "Method, System, and Program for Managing Storage Units in Storage Pools" by inventors W.C. Carlson et al.

U.S. Appl. No. 10/230,639, filed Aug. 29, 2002, entitled "Method, System, and Article of Manufacture for Managing Storage Pools" by inventors G.T. Kishi et al.

U.S. Appl. No. 10/231,816, filed Aug. 29, 2002, entitled "Method, System, and Article of Manufacture for Borrowing Physical Volumes" by inventors G.T. Kishi et al.

U.S. Appl. No. 10/230,789, filed Aug. 29, 2002, entitled "Method, System, and Program for Managing an Out of Available Space Condition" by inventors K. L. Gibble et al.

U.S. Appl. No. 10/231,815, filed Aug. 29, 2002, entitled "Method, System, and Program for Moving Data Among Storage Units" by inventors G.T. Kishi et al.

M. Werner, et al., "Magstar Peer-To-Peer Virtual Tape Server Planning and Implementation Guide", IBM Corp., Dec. 2000, Document No. SG24-6115-00, Chapters 1 and 2.

IBM Corp., "Logical Grouping of Data Storage Media in a Library System", Technical Disclosure Bulletin, vol. 35, No. 5, Oct. 1992, pp. 17-20.

* cited by examiner

FIG. 12

Borrowing policy table /—134

| | First media type to borrow | Second media type to borrow | Interpretation | Precedence of borrowing |
|---|---|---|---|---|
| Borrowing case "J only" | J media type | none | only borrow J media type | 1 |
| Borrowing case "K" only | K media type | none | only borrow K media type | 1 |
| Borrowing case "J-K" | J media type | K media type | J preferred; borrow K only if there are no J available | 2 |
| Borrowing case "K-J" | K media type | J media type | K preferred; borrow J only if there are no K available | 2 |
| Borrowing case "either" | either media type | none | borrow a physical volume of a type that there are more in the scratch pool | 3 |
| Borrowing case "none" | none | none | borrowing is not enabled | no precedence |

METHOD, SYSTEM, AND ARTICLE OF MANUFACTURE FOR RETURNING PHYSICAL VOLUMES

BACKGROUND OF THE INVENTION

1. Field of the Invention

The present invention relates to a method, system, and an article of manufacture for returning physical volumes.

2. Description of the Related Art

In prior art virtual tape storage systems, hard disk drive storage emulates tape drives and tape cartridges. For instance, host systems perform input/output (I/O) operations with respect to a tape library by performing I/O operations with respect to a set of hard disk drives that emulate the tape library. In prior art virtual tape storage systems, such as the International Business Machines (IBM) Magstar** Virtual Tape Server, at least one virtual tape server (VTS) is coupled to a tape library comprising numerous tape drives and tape cartridges. The VTS is also coupled to a direct access storage device (DASD), comprised of numerous interconnected hard disk drives.

The DASD functions as a cache to volumes in the tape library. In VTS operations, the VTS processes the host's requests to access a volume in the tape library and returns data for such requests, if possible, from the cache. If the volume is not in the cache, then the VTS recalls the volume from the tape library to the cache, i.e., the VTS transfers data from the tape library to the cache. The VTS can respond to host requests for volumes that are present in the cache substantially faster than requests for volumes that have to be recalled from the tape library to the cache. However, since the capacity of the cache is relatively small when compared to the capacity of the tape library, not all volumes can be kept in the cache. Hence, the VTS also premigrates volumes from the cache to the tape library, i.e., the VTS transfers data from the cache to the tape cartridges in the tape library.

The tape library may comprise a plurality of storage pools. Each storage pool may comprise of zero, one or a plurality of tape cartridges. Requests from a host may identify a storage pool into which particular data should be written into.

Notwithstanding the use of storage pools in a virtual tape library, there is a need in the art for improved techniques for managing storage pools in virtual tape library systems.

SUMMARY OF THE PREFERRED EMBODIMENTS

Provided are a method, system and article of manufacture for return processing in storage pools. A plurality of physical volumes are allocated to a first storage pool. A determination is made whether the first storage pool has more than a threshold number of empty physical volumes. If the first storage pool has more than the threshold number of empty physical volumes, then at least one empty physical volume is returned to a second storage pool. In certain implementations, the returned physical volume is the one that has undergone more usage than other empty physical volumes present in the first storage pool.

In further implementations, the first storage pool is a data pool, the second storage pool is a scratch pool, the first storage pool is capable of borrowing additional physical volumes in the first storage pool from the second storage pool, and the threshold number is three.

Additional implementations provide a method, system, and article of manufacture for return processing in storage pools. A determination is made whether a first storage pool has been updated within a first elapsed time period. If the first storage pool has not been updated within the first elapsed time period then a number of physical volumes to remain in the first storage pool is set to zero, the borrowing of physical volumes to the first storage pool from a second storage pool is disabled, and the returning of physical volumes from the first storage pool is allowed.

In further implementations, normal returning and borrowing is allowed in the first storage pool if the first storage pool been been updated within a second elapsed time period, wherein the second elapsed time period is less than the first elapsed time period.

In yet further implementations, a determination is made whether the first storage pool has been updated within a second elapsed time period, wherein the second elapsed time period is less than the first elapsed time period. If the first storage pool has not been updated within the second elapsed time period the number of physical volumes to remain in the first storage pool is set to three, the borrowing of physical volumes to the first storage pool from a second storage pool is disabled, and the returning of physical volumes from the first storage is allowed.

The implementations achieve substantially uniform utilization of the physical volumes by providing improved techniques for returning physical volumes to the scratch pool after the physical volumes have been used and are empty. In certain implementations, at least three empty physical volumes that have been used the least are left in each storage pool. Certain implementations also reduce the unnecessary borrowing and returning of physical volumes by limiting the borrow and return processes to be used with recently active pools. Furthermore, when a pool has been inactive for an extended period of time, empty physical volumes from the inactive pool may be returned to the scratch pool. Therefore, physical volumes are shared and reused more often by data pools and are used substantially uniformly.

BRIEF DESCRIPTION OF THE DRAWINGS

Referring now to the drawings in which like reference numbers represent corresponding parts throughout:

FIG. 12 illustrates a table that indicates borrowing policies that may be applied to physical volumes, in accordance with certain described implementations of the invention;

DETAILED DESCRIPTION OF THE PREFERRED EMBODIMENTS

In the following description, reference is made to the accompanying drawings which form a part hereof and which illustrate several implementations. It is understood that other implementations may be utilized and structural and operational changes may be made without departing from the scope of the present implementations.

Figure 1:
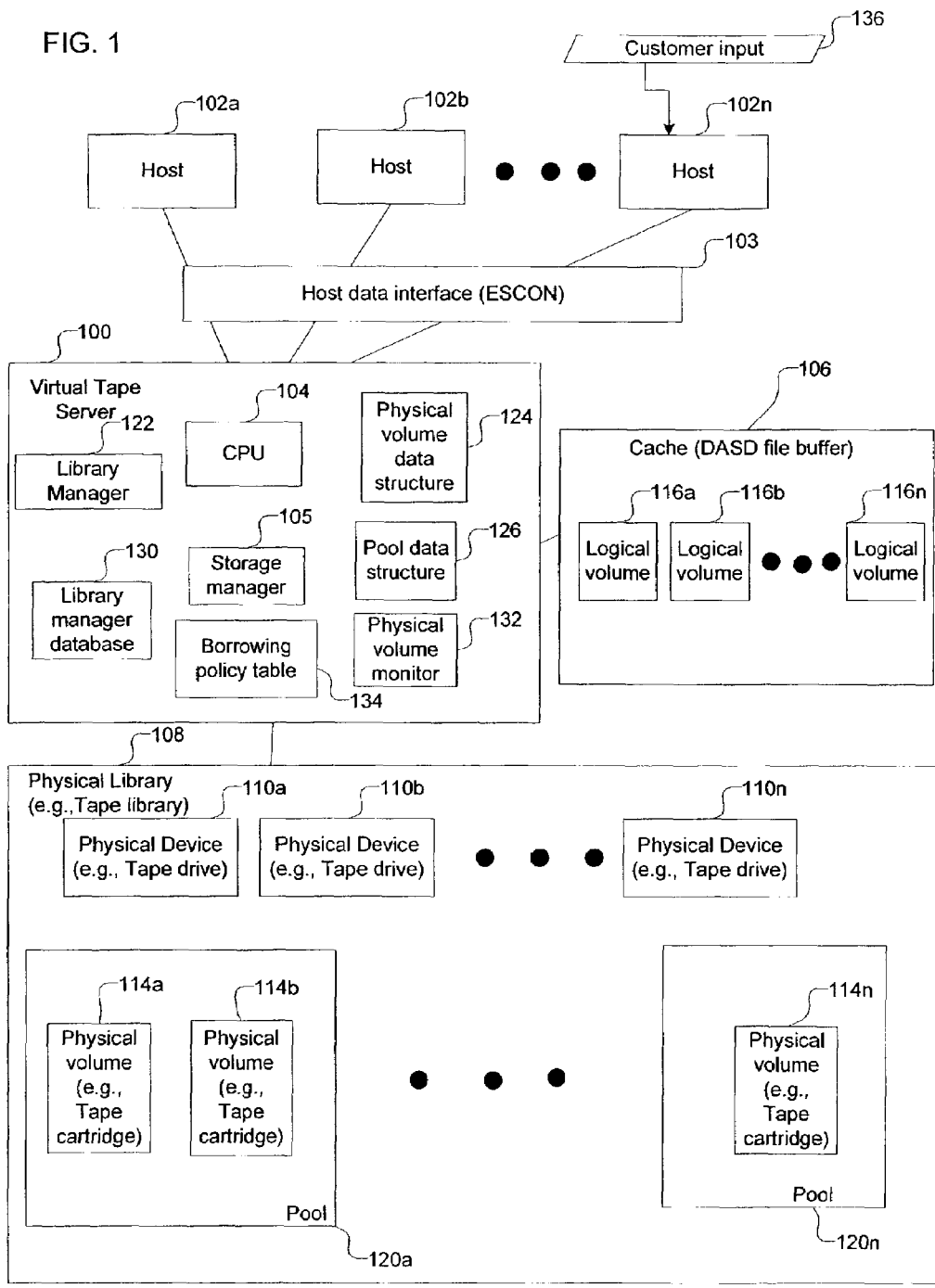
FIG. 1 illustrates a block diagram of a computing environment, in accordance with certain described aspects of the invention.

FIG. 1 illustrates a computing environment utilizing a Virtual Tape Server (VTS) 100. Additional VTSs can be deployed, but for purposes of illustration, a single VTS 100 is shown. The VTS 100 is any server computational device known in the art and includes any operating system known in the art. For instance, in certain implementations of the invention, the VTS 100 may be implemented in one or more computers comprising an IBM RS/6000 system and include the IBM AIX operating system.

A plurality of hosts 102*a*, 102*b*, . . . , 102*n* connect to the VTS 100. The hosts 102*a* . . . 102*n* may connect to the VTS 100 through a host data interface 103 channel, such as the Enterprise System Connection (ESCON) channel or any other direct connection or switching mechanism known in the art (e.g., fibre channel, Storage Area Network (SAN) interconnections, etc.). The hosts 102***a* . . . 102*n* may be any computational device known in the art, such as a personal computer, a workstation, a server, a mainframe, a hand held computer, a palm top computer, a telephony device, network appliance, etc. The hosts 102*a* . . . 102*n* may include any operating system known in the art, such as the IBM OS/390** operating system.

The VTS 100 includes at least one central processing unit (CPU) 104 and an application, such as a storage manager 105 that manages storage. The storage manager 105 may be implemented either as a standalone application or as a part of one or more other applications. The storage manager 105 manages a cache 106, such as a DASD file buffer, and a physical library 108, such as a tape library. In certain implementations, the storage manager 105 may include software to utilize a tape library, such as the IBM Magstar Virtual Tape Server, and the IBM ADSTAR Distributed Management (ADSM) software or Tivoli Storage Manager. The storage manager 105 may perform or manage the data movement operations between the hosts 102*a* . . . 102*n*, the cache 106, and the physical library 108. Further details of the VTS technology are described in the IBM publication "Magstar** Peer-to-Peer Virtual Tape Server Planning and Implementation Guide," IBM document no. SG24-6115-00 (Copyright IBM, 2000), which publication is incorporated herein by reference in its entirety.

The physical library 108 may comprise an IBM Magstar Tape Library, such as the Magstar 3494 Tape Library, or any other tape library system known in the art. In certain implementations, the physical library 108 comprises numerous physical devices 110*a*, 110*b*, . . . 110*n*, such as tape drives, CD ROM drives, DVD ROM drives, etc. The physical library 108, in addition to including the physical devices 110*a* . . . 110*n*, includes physical volumes 114*a* . . . 114*n*. A physical volume may be mounted on any of the physical devices 110*a* . . . 110*n*. The physical volumes 114*a* . . . 114*n* may be of a variety of media types such as tape cartridges, CD ROMs, DVDs, etc. In certain implementations the physical volumes 114*a* . . . 114*n* may be mounted via mechanical loading onto the physical devices 110*a* . . . 110*n*. The number of physical volumes 114*a* . . . 114*n* are larger than the number of physical devices 110*a* . . . 100*n*.

The cache 106 may comprise numerous interconnected hard disk drives. The cache 106 improves performance by allowing host I/O requests from the hosts 102*a* . . . 102*n* to the physical library 108 to be serviced from the faster access cache 106 as opposed to the slower access physical library 108. The disks in the cache may be arranged as a Direct Access Storage Device (DASD), Just a Bunch of Disks (JBOD), Redundant Array of Inexpensive Disks (RAID), etc. The storage manager 105 maps the cache 106 to a plurality of logical (virtual) devices (not shown). The hosts 102*a* . . . 102*n* perform I/O operations by accessing logical (virtual) volumes 116*a* . . . 116*n* in the logical devices via the VTS 100. The storage manager 105 maps the logical volumes 116*a* . . . 116*n* to the physical volumes 114*a* . . . 114*n*. Thus, the logical volumes 116*a* . . . 116*n* in the cache 106 correspond to the physical volumes 114*a* . . . 114*n* in the physical library 108. The logical volumes 116*a* . . . 116*n* resident on the cache 106 may change over time. The storage manager 105 attempts to keep the more likely to be used logical volumes 116*a* . . . 116*n* in the cache. Although the hosts 102*a* . . . 102*n* may access data via the logical volumes, the data is physically stored in the physical volumes 114*a* . . . 114*n* mountable on the physical devices 110*a* . . . 110*n*.

When a host 102*a* . . . 102*n* writes a logical volume to the VTS 100, the data is stored as a file in the cache 106. The cached data is later migrated onto a physical volume 114*a* . . . 114*n*. The original logical volume is left in the cache 106 for cache hits. When the cache 106 fills to a predetermined threshold, the logical volume data for a selected logical volume 116*a* . . . 116*n* is removed from the cache to free space for more logical volumes. In certain implementations, the storage manager 105 removes from the cache 106 a selected logical volume (selected from the logical volumes 116*a* . . . 116*n*) that has been resident on the cache 106 for the longest period of time.

When a host 102*a* . . . 102*n* requests a logical volume from the VTS 100, a cache hit occurs if the logical volume is resident in the cache 106. If the logical volume is not resident in the cache, then the storage manager 105 determines whether the corresponding physical volume 114*a* . . . 114*n* is mounted on one of the physical devices 110*a* . . . 110*n*. If the corresponding physical volume 114*a* . . . 114*n* is not mounted then the storage manager 105 mounts the corresponding physical volume 114a . . . 114n on one of the physical devices 110a . . . 110n. The data for the logical volume is then transferred back, i.e., recalled, from the corresponding physical volume 114a . . . 114n.

Physical volumes 114a . . . 114n may be logically divided into one or more storage pools (hereinafter referred to as pools) 120a . . . 120n, where each pool 120a . . . 120n has zero, one or more physical volumes 114a . . . 114n. The hosts 102a . . . 102n may specify a particular pool 120a . . . 120n while reading and writing data via the VTS 100 by accessing a logical volume 116a . . . 116n. In certain implementations, each customer using the VTS 100 may have the customer's data stored on a separate pool 120a . . . 120n, thereby segregating each customer's data on a different subset of physical volumes 114a . . . 114n. The division of the physical volumes 114a . . . 114n into pools 120a . . . 120n may be done for a variety of other reasons, including for storing different types of data in different pools, etc.

An application, such as, a library manager 122, is coupled to the VTS 100 to manage the physical library 108 including the pools 120a . . . 120n. In alternative implementations, the library manager 122 may be coupled to the physical library 108 or to any other computational device (not shown). The library manager 122 may either be a standalone application or be part of any other application or subsystem, such as, the storage manager 105, the VTS 100, the physical library 108 etc. The library manager 122 may interact with various data structures such as a physical volume data structure 124 and a pool data structure 126. The physical volume data structure 124 includes attributes of data structures related to the physical volumes 114a . . . 114n, and the pool data structure 126 include attributes of data structures related to the pools 120a . . . 120n. The physical volume data structure 124 and the pool data structure 126 may be implemented in the VTS 100 in any manner known in the art, such as via tables, linked lists, etc. The library manager 122 interacts with a library manager database 130, where the library manager database 130 may store information regarding the pools 120a . . . 120n and the physical volumes 114a . . . 114n. In certain implementations, the library manager database 130 includes various instances of the physical volume data structure 124 and the pool data structure 126. The library manager database 130 may be any database known in the art such as a relational, hierarchical or object oriented database management system. An application, such as a physical volume monitor 132 may also be included in the VTS 100, where the physical volume monitor 132 may monitor the functioning of the physical volumes 114a . . . 114n. A table or an equivalent data structure, such as a borrowing policy table 134 may also be included in the VTS 100. The borrowing policy table 132 may contain rules for borrowing physical volumes 114a . . . 114n from one pool to another. In alternative implementations, the information contained in the borrowing policy table 132 may be contained in other data structures, such as in the pool data structure 126, and the borrowing policy table 132 may be absent. In alternative implementations, the library manager database 130, the physical volume data structure 124, the pool data structure 126, the physical volume monitor 132, and the borrowing policy table 132 may be coupled to the physical library 108 or to any other computational device (not shown).

A customer input 136 for data from the VTS 100 maybe conveyed to the VTS 100 via a host 102a . . . 102n (for illustration purposes the customer input 136 is shown coupled to host 102n). The customer input 136 many include requests for reading or writing data, where the requests are conveyed by the hosts 102a . . . 102n to the VTS 100. In alternative implementations, the customer input 136 may be made directly to the VTS 100 without involving the hosts 102a . . . 102n. Customer input 136 may specify a pool 120a . . . 120n that is associated with the data. In such a case the VTS 100 may satisfy the customer request from the specified pool 120a . . . 120n. In certain alternative implementations, the VTS 100 or the library manager 122 may associate a specific pool 120a . . . 120n with a specific customer input 136, even when the specific customer input 136 does not specify any particular pool 120a . . . 120n.

Other alternative implementations of storage systems that do not conform to the illustrated computing environment may also be used for implementations of the invention. For example, storage systems different from a VTS may be used for alternative implementations of the invention. As long as storage pools 120a . . . 120n can be constructed from a plurality of physical volumes, implementations of the invention may be implemented in a variety of computing environments.

Figure 2:
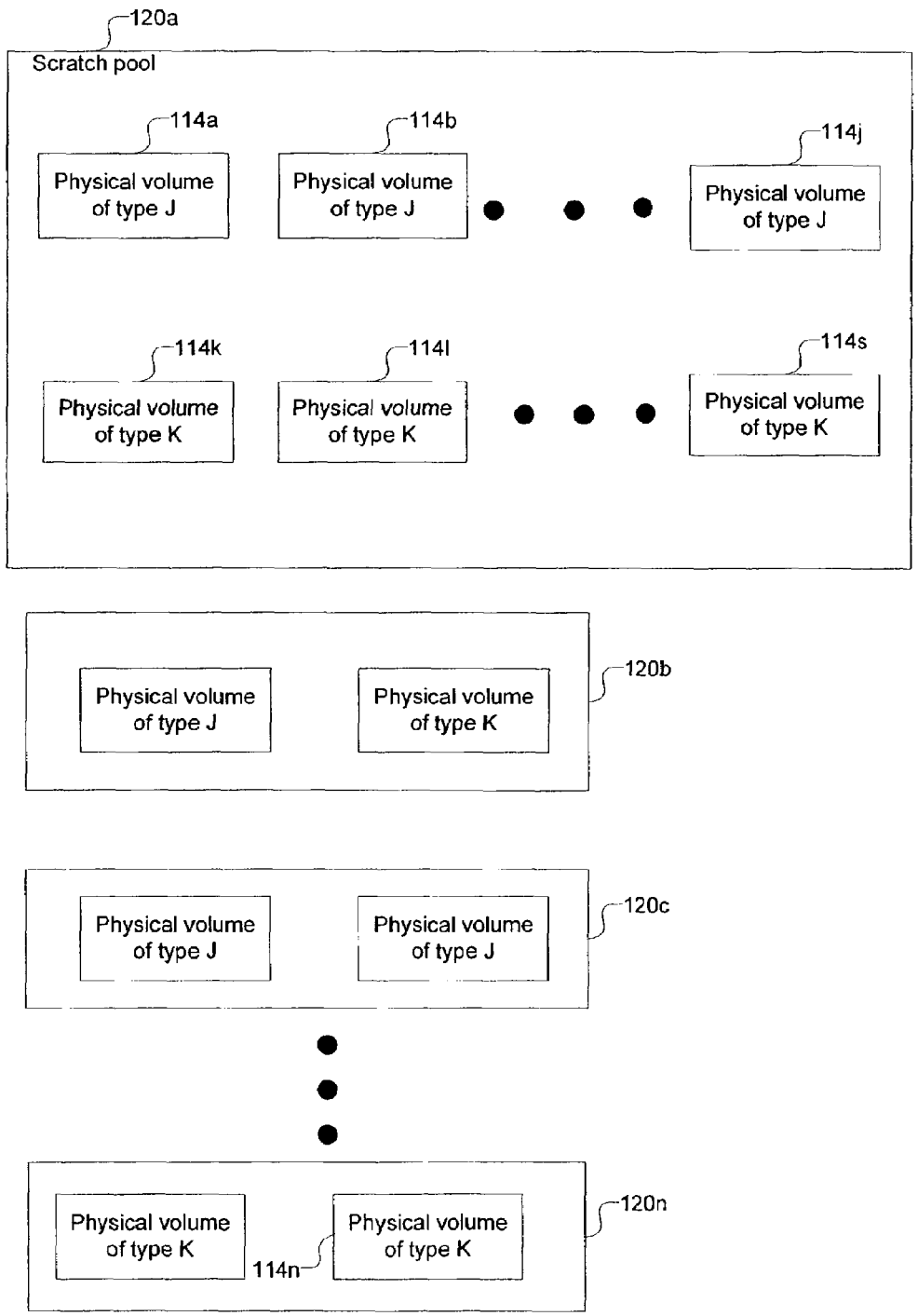
FIG. 2 illustrates a block diagram of physical volumes divided into pools, in accordance with certain described implementations of the invention.

FIG. 2 is a block diagram illustrating how physical volumes (such as physical volumes 114a . . . 114n) may be divided into pools 120a . . . 120n, in accordance with certain implementations of the invention. While a specific example of dividing physical volumes 114a . . . 114n into pools is shown, other variations in which the physical volumes 114a . . . 114n are divided into pools 120a . . . 120n in a different way are included within the scope of the implementations of the invention.

The pool 120a is also a scratch pool 120a and may include a large number of physical volumes 114a . . . 114s selected from the physical volumes 114a . . . 114n. In certain implementations, the scratch pool 120a may include over a thousand physical volumes. The scratch pool 120a includes physical volumes of two different types,—type "J" (illustrated by reference numerals 114a . . . 114j) and type "K" (illustrated by reference numerals 114k . . . 114s). Type "J" and type "K" physical volumes have different characteristics. For example, one type of physical volume may be capable of storing a larger amount of data when compared to the other type. However, access time for the type capable of storing a larger amount of data may be slower when compared to the access time of the other type. While only two types of physical volumes have been shown, the scratch pool 120a may include a lesser or a greater number of types of physical volumes. The physical volumes 114a . . . 114s included in the scratch pools 120a have no active data, i.e., the physical volumes 114a . . . 114j are either empty, have data that has expired, or contain data that may be overwritten by the hosts 102a . . . 102n.

In certain implementations of the inventions, the plurality of pools 120b . . . 120n may borrow and return physical volumes to the scratch pool 120a. The plurality of pools 120b . . . 120n may also be referred to as data pools or active pools as data maybe written into physical volumes when physical volumes are present in pools 120b . . . 120n. In FIG. 2, pool 120b has physical volumes of type J and type K, pool 120c has physical volumes of type J only, and pool 120n has physical volumes of type K only. A pool 120b . . . 120n may borrow a physical volume from the scratch pool 120a when additional data needs to be written that cannot be accommodated into the existing physical volumes within the pool 120b . . . 120n. When a physical volume is no longer required by a pool 120b . . . 120n, the physical volume may be returned to the scratch pool 120a.

The scratch pool 120a allows the sharing of a large number of physical volumes 114a . . . 114s, among the pools 120*b* . . . 120*n*. When a pool 120*b* . . . 120*n* needs a physical volume for writing additional data, the new physical volume may be borrowed from the scratch pool 120*a*. A physical volume may be returned to the scratch pool 120*a* after the physical volume has been used by a pool 120*b* . . . 120*n*. In the absence of the scratch pool 120*a*, each pool 120*b* . . . 120*n* may need to be permanently assigned with a fixed set of physical volumes.

Figure 3:
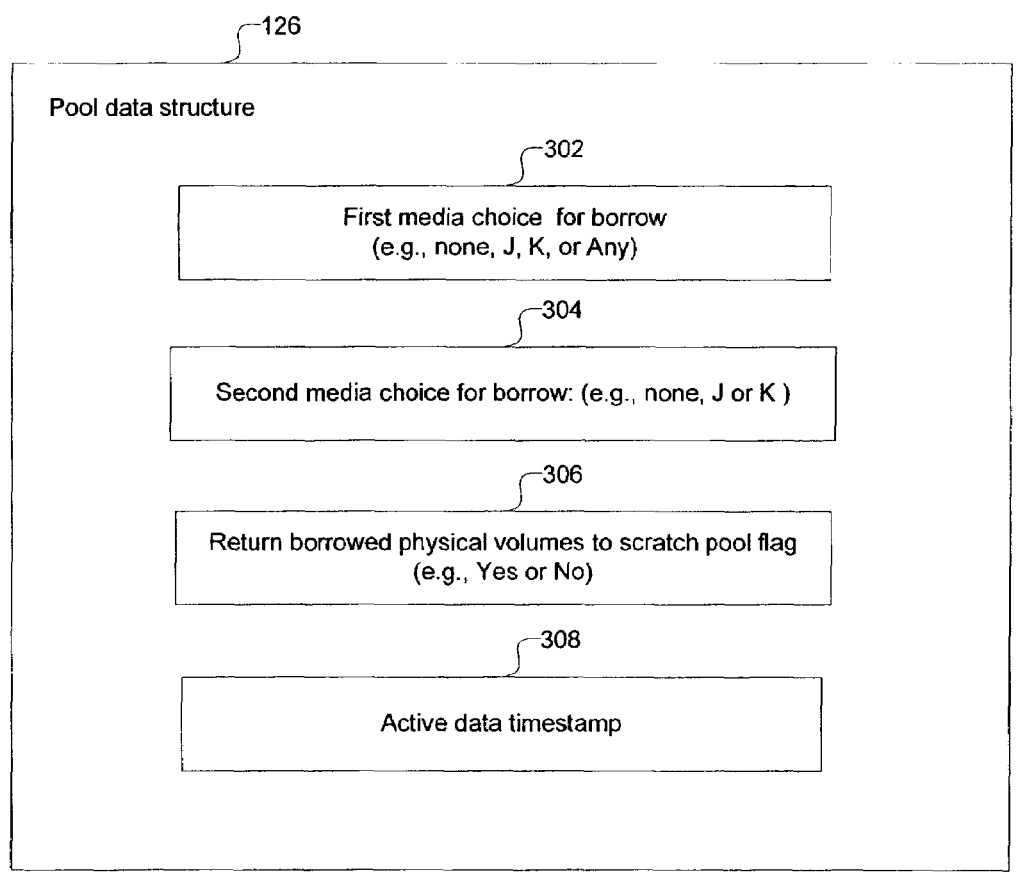
FIG. 3 illustrates a block diagram of pool data structures, in accordance with certain described implementations of the invention.

FIG. 3 illustrates a block diagram of the pool data structure 126, in accordance with certain described implementations of the invention. The pool data structure 126 may reside in the virtual tape server 100. The pool data structure 126 is associated with each pool 120*a* . . . 120*n*, i.e., each pool 120*a* . . . 120*n* has an instance of the pool data structure 126. In certain implementations, the instances of the pool data structures 126 for each pool 120*a* . . . 120*n* may be constructed by the library manager 128 and stored in the library manager database 130. In alternative implementations other processes in the VTS 100 may construct the instances of the pool data structure 126 and store the instances in locations different from the library manager database 130.

A first field of the pool data structure 126 is a "First media choice for borrow" field 302. The entry of the field 302 for a particular pool indicates the preferred type of physical volume 114*a* . . . 114*n* that the particular pool may borrow from the scratch pool 120*a*. In certain implementations, the preferred type for the entry of field 302 may be chosen from (i) "none", (ii) type "J", (iii) type "K", (iv) either of type "J" or type "K", where "J" and "K" are media types for different types of physical volumes. If the "first media choice for borrow" field 302 is "none" for a particular pool, then the particular pool is not allowed to borrow physical volumes of any type. Otherwise, the entry of field 302 reflects the type(s) of physical volumes that may be borrowed by a pool.

A second field of the pool data structure 126 is a "Second media choice for borrow" field 304. The entry of field 304 for a particular pool indicates the second choice of the type of physical volume 114*a* . . . 114*n* that the particular pool may borrow from the scratch pool 120*a*. In certain implementations, the preferred type for the entry of field 302 may be chosen from (i) neither of J or K, (ii) type J, (iii) type K, where J and K are media types for different types of physical volumes.

A third field of the pool data structure 126 is a "Return borrowed physical volumes to scratch pool" field 306. If the field 306 is "yes" for a particular pool, then the particular pool may return a physical volume 114*a* . . . 114*n* to the scratch pool 120*a* after the physical volume 114*a* . . . 114*n* is empty. If the field 206 is "no" for a particular pool, then the particular pool may not return a physical volume to the scratch pool 120*a*, i.e., the physical volume is a permanent member of the particular pool.

A fourth field of the pool data structure 126 is an "active data timestamp" field 308. The field 308 for a particular pool includes the time when data on the particular pool was accessed for any purpose, including in response to read or write requests from the hosts 102*a* . . . 102*n*. The "active data timestamp" field may be reset to zero.

Figure 4:
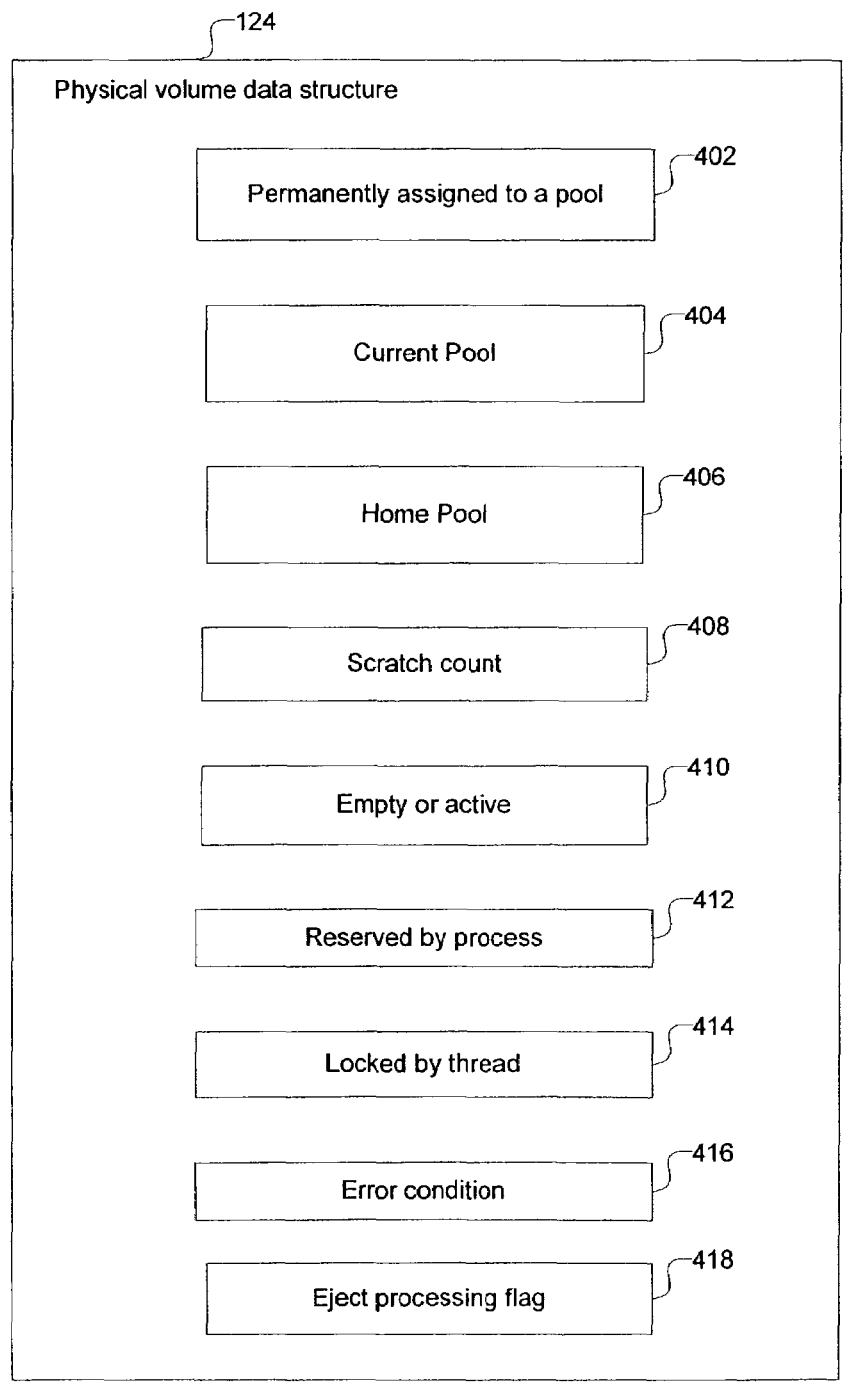
FIG. 4 illustrates a block diagram of physical volume data structures, in accordance with certain described implementations of the invention.

FIG. 4 illustrates a block diagram of the physical volume data structure 124, in accordance with certain implementations of the invention. Each physical volume 114*a* . . . 114*n* has an instance of the physical volume data structure 124 coupled to the physical volume 114*a* . . . 114*n*. In certain implementations, the instances of the physical volume data structure for each physical volume 114*a* . . . 114*n* may be constructed by the library manager 128 and stored in the library manager database 130. In alternative implementations other processes in the VTS 100 may construct the instances of the physical volume data structure 126 and store the instances in locations different from the library manager database 130.

A first field of the physical volume data structure 124 is a "permanently assigned to a pool" field 402. If the "permanently assigned to a pool" field 402 for a particular physical volume indicates a specific pool 120*a* . . . 120*n*, then the particular physical volume is permanently assigned to the specific pool 120*a* . . . 120*n*. In certain implementations, such permanent assignments may take place when the particular physical volume is to be used exclusively by one user or a particular application. The permanent assignment of a particular physical volume to a storage pool 120*a* . . . 120*n* may be accomplished using an user interface associated with the library manager 128, during the time when the physical volumes 114*a* . . . 114*n* are first inserted into the physical library 108.

If a particular physical volume is permanently assigned to a pool and the pool is not a scratch pool, then the particular physical volume will at some point in time have data written into the particular physical volume. Even after all the data written to the particular physical volume has expired or has been removed, the physical volume still stays assigned to the pool.

A second field of the physical volume data structure 124 is a "current pool" field 404 indicating the pool in which a physical volume 114*a* . . . 114*n* is currently present. For example, if the "current pool" field of a particular physical volume is pool 120*b*, then the particular physical volume is currently present in pool 120*b*.

A third field of the physical volume data structure 124 is a "home pool" field 406 indicating the pool to which a specific physical volume 114*a* . . . 114*n* should be returned to whenever the specific physical volume 114*a* . . . 114*n* is empty. In certain implementations of the invention, the home pool field 406 for a physical volume 114*a* . . . 114*n* is the scratch pool 120*a*. For example, if the "home pool" field of a particular physical volume is the scratch pool 120*a*, then the particular physical volume may be returned to the scratch pool 120*a* after the particular physical volume has been in some pool other than the scratch pool 120*a*.

In certain implementations of the invention the "permanently assigned to pool" field 402 is not used, and a physical volume is assumed to be permanently assigned to the current pool of the physical volume if the "home pool" field 406 of the physical volume equals the "current pool" field 404 of the physical volume.

A fourth field of the physical volume data structure 124 is a "scratch count" field 408 indicating the number of the times a physical volume 114*a* . . . 114*n* has been borrowed and used. The value in the "scratch count" field 408 for a particular physical volume is an indicator of the total number of times the particular physical volume has been used since the physical volume 114*a* . . . 114*n* was new. In alternative implementations the "scratch count" field 408 for a particular physical volume may reflect the number of times the particular physical volume was returned.

A fifth field of the physical volume data structure 124 is an "empty or active" field 410. If field 410 is labeled as "active" for a particular physical volume then there is valid data on the particular physical volume and the physical volume is in use. If field 408 is labeled as "empty" for a particular physical volume then there is no valid data on the particular physical volume and new data can be written on the physical volume.

A sixth field of the physical volume data structure 124 is a "reserved by process" field 412. The field 412 may contain the identity of a process that has the physical volume associated with the physical volume data structure 124 reserved for the process.

A seventh field of the physical volume data structure 124 is a "locked by thread" field 414. The field 414 may contain the identity of a thread that has the physical volume associated with the physical volume data structure 124 locked by the thread. Such locking may be necessary when the physical volume associated with the physical volume data structure 124 is being updated. There may also be other reasons for locking a physical volume.

An eighth field of the physical volume data structure 124 is an "error condition" field 416. The field 416 may contain an error code that reflects an error condition associated with the processing of the physical volume corresponding to the physical volume data structure 124.

A ninth field of the physical volume data structure 124 is an "eject processing flag" field. The field 418 may indicate that the physical volume corresponding to the physical volume data structure 124 is marked for eject processing.

Alternative implementations of the invention may merge or not use certain of the of the nine fields 402, 404, 406, 408, 410, 412, 414, 416, 418, or use a subset of the nine fields 402, 404, 406, 408, 410, 412, 414, 416, 418 in different storage devices.

Figure 5:
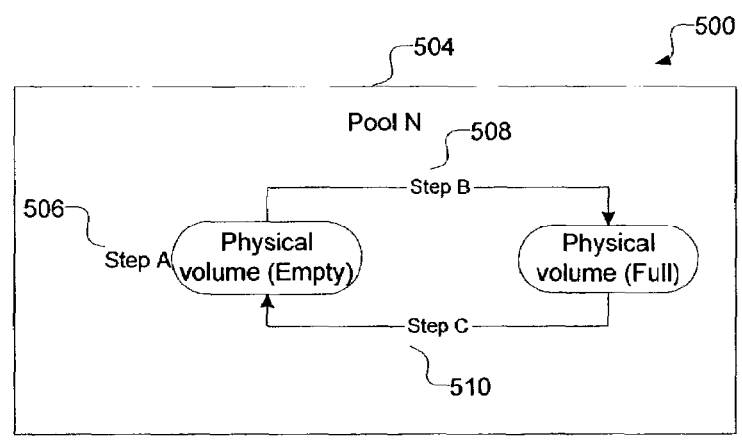
FIG. 5 illustrates via a flow diagram and a corresponding table a process by which a physical volume spends entire life cycles in the same pool, in accordance with certain described implementations of the invention.

FIG. 5 illustrates via a flow diagram 500 and a corresponding table 502, a process in which a physical volume spends the entire life cycle of the physical volume in the same pool, in accordance with certain implementations of the invention. Operations shown in the flow diagram of FIG. 5 may be performed by the library manager 122, or by any other process coupled to the VTS 100.

The flow diagram 500 illustrates a pool N 504, where the pool N 504 may be one pool out of the pools 120a . . . 120n. The pool N 504 has a physical volume, where the physical volume has the name PV0001. The current pool 404 and the home pool 406 of the physical volume is always pool N. The "return borrowed physical volume to scratch pool" flag 306 for the physical volume is permanently assigned to "no". At step A 506 the physical volume is empty. The various fields in the physical volume data structure 124 of the physical volume and the pool data structure 126 of the pool N 504 during the execution of step A 506 are shown in row 502a of table 502.

Subsequent to step A, data is written to the physical volume during the course of step B 508 and the physical volume becomes full, i.e., there is no further space to write data into the physical volume. The various fields in the physical volume data structure 124 and the pool data structure 126 at the conclusion of step B 508 are shown in row 502b of table 502.

Subsequent to step B, the physical volume undergoes step C 510 and becomes empty. In certain implementations, the physical volume undergoes step C 510 when the data in the physical volume expires or is no longer required for some other reason. In alternative implementations, small amounts of data remaining on the physical volume (an initial physical volume) can be transferred to another physical volume, emptying the initial physical volume. The various fields in the physical volume data structure 124 and the pool data structure 126 at the conclusion of step C 508 are shown in row 502c of table 502.

FIG. 5 illustrates the situation where a physical volume spends the entire life cycle of the physical volume in the same pool. Since the current pool and home pools of the physical volume are pool N and pool N does not return physical volumes, the physical volume spends the entire life cycle of the physical volume in the same pool, i.e. in pool N 504. The physical volume alternates between empty and full state repeatedly inside pool N 504.

Figure 6:
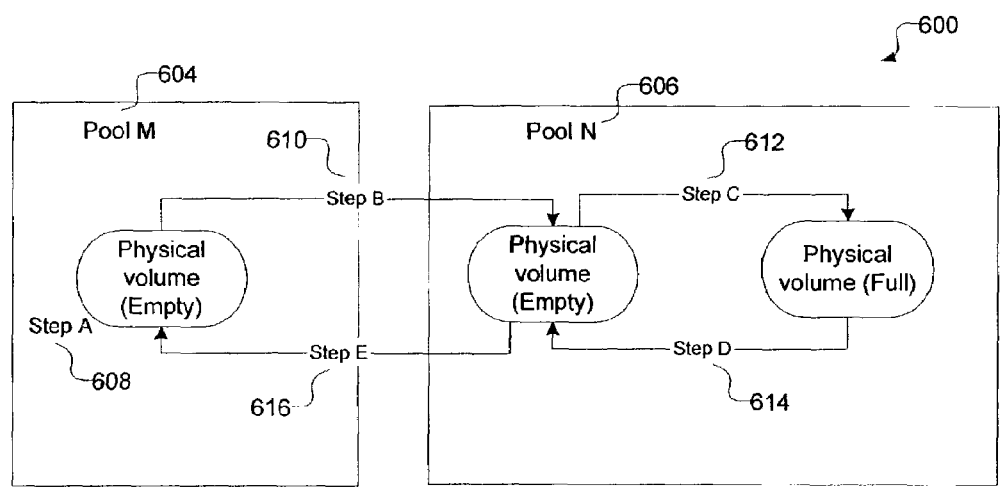
FIG. 6 illustrates via a flow diagram and a corresponding table a process by which a physical volume is borrowed from a pool and then subsequently returned to the original pool, in accordance with certain described implementations of the invention.

FIG. 6 illustrates via a flow diagram 600 and a corresponding table 602, a process by which a physical volume is borrowed from a scratch pool and then subsequently returned to the scratch pool, in accordance with certain described implementations of the invention. Operations shown in the flow diagram of FIG. 6 may be performed by the library manager 122, or by any other process coupled to the VTS 100.

The flow diagram 600 illustrates a pool M 604 and a pool N 606, where the pools M 604 and N 606 may be selected from the pools 120a . . . 120n. A physical volume, where the physical volume has the name PV0002 may move between pool M 604 and pool N 606. The home pool 606 of the physical volume is always pool M 604. The "return borrowed physical volume to scratch pool" flag 306 for pool N 606 is permanently assigned to "Yes".

At step A 608 the physical volume is empty and is present in pool M 604. The various fields in the physical volume data structure 124 for the physical volume and the pool data structure 126 for pool N during step A 608 are shown in row 602a of table 602.

Subsequent to step A, during step B 610 the empty physical volume is borrowed by pool N 606 from pool M 604. The various fields in the physical volume data structure 124 of the physical volume and the pool data structure 126 of pool N 606 at the conclusion of step B 610 are shown in row 602b of table 602. As a result of the movement of the physical volume from pool M 604 to pool N 606 the "current pool" field 404 of the physical volume changes to pool N in row 602b (the current pool 404 of the physical volume was pool M during step A, as shown in row 602a).

Subsequent to step B, during step C 612 the empty physical volume is written into in pool M and becomes full at the conclusion of step C 612. The various fields in the physical volume data structure 124 for the physical volume and the pool data structure 126 for pool N at the conclusion of step C 612 are shown in row 602c of table 602.

Subsequent to step C, during step D 614 the filled physical volume is emptied and at the conclusion of step D 614, the physical volume is in the empty state in pool N 606. The various fields in the physical volume data structure 124 for the physical volume and the pool data structure 126 for pool N at the conclusion of step D 614 are shown in row 602d of table 602.

Subsequent to step D, during step E 616 the empty physical volume is returned from pool N 606 to the "home pool" 406, i.e., the empty physical volume is returned to pool M 604. At the conclusion of step E 616, the physical volume is in the empty state in pool M 604. The various fields in the physical volume data structure 124 of the physical volume and the pool data structure 126 for pool N at the conclusion of step E 616 are shown in row 602e of table 602. Since the home pool of the physical volume is pool M 604, and in pool N 606 the "return borrowed physical volume to scratch pool" flag 306 for pool N 606 is permanently assigned to "Yes", the physical volume can be returned from pool N 606 to the home pool 406 (i.e., pool M 604).

In the VTS 100, the pool M 604 is the scratch pool 120a. Therefore, FIG. 6 illustrates a process where a physical tape is borrowed from a scratch pool to a pool, used in the pool and returned back to the scratch pool when the pool is empty.

Figure 7:
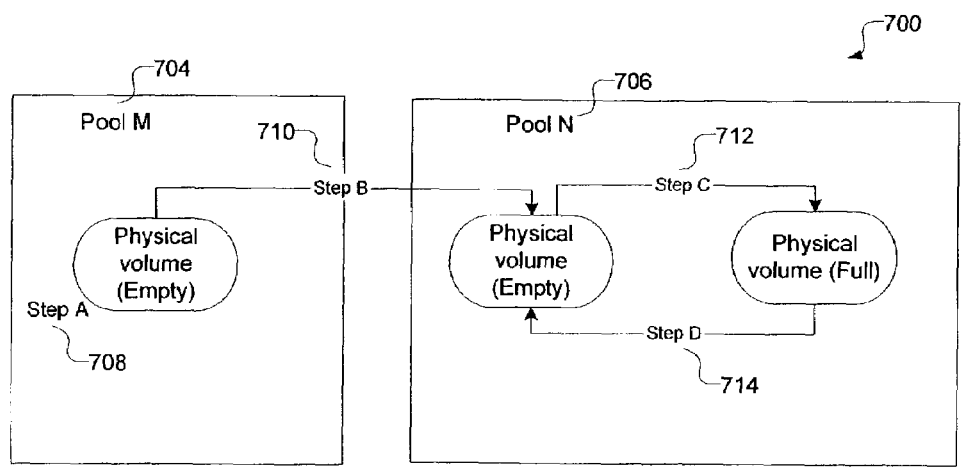
FIG. 7 illustrates via a flow diagram and a corresponding table a process by which a physical tape volume is borrowed into a pool, used in the pool, and then reused in the same pool, in accordance with certain described implementations of the invention.

FIG. 7 illustrates via a flow diagram 700 and a corresponding table 702, a process by which a physical tape volume is borrowed into a pool, used in the pool and then reused in the pool, in accordance with certain described implementations of the invention. Operations shown in the flow diagram of FIG. 7 may be performed by the library manager 122, or by any other process coupled to the VTS 100.

The flow diagram 700 illustrates a pool M 704 and a pool N 706, where the pools M 704 and N 706 may be selected from the pools 120a . . . 120n. A physical volume, where the physical volume has the name PV0003 may move between pool M 604 and pool N 606. The home pool 706 of the physical volume is always pool M 704. The "return borrowed physical volume to scratch pool" flag 306 for pool N 706 is permanently assigned to "No".

At step 708 the physical volume is empty and the physical volume is present in pool M 704. The various fields in the physical volume data structure 124 for the physical volume and the pool data structure 126 for pool N 706 during step A 708 are shown in row 702a of table 702.

Subsequent to step A, during step B 710 the empty physical volume is borrowed by pool N 706 from pool M 704. The various fields in the physical volume data structure 124 for the physical volume and the pool data structure 126 for the pool N 706 at the conclusion of step B 710 are shown in row 702b of table 702. As a result of the movement of the physical volume from pool M 704 to pool N 706, the "current pool" 404 of the physical volume changes to pool N in row 702b (the current pool 404 of the physical volume was pool M during step A 708, as shown in row 702a).

Subsequent to step B, during step C 712 the empty physical volume in pool M 704 is written into and the empty physical volume becomes full at the conclusion of step C 712. The various fields in the physical volume data structure 124 and the pool data structure 126 at the conclusion of step C 712 are shown in row 702c of table 702.

Subsequent to step C, during step D 714 the filled physical volume is emptied and at the conclusion of step D 714, the physical volume is in the empty state in pool N 706. The various fields in the physical volume data structure 124 for the physical volume and the pool data structure 126 for pool N 706 at the conclusion of step D 714 are shown in row 702d of table 602. The pool M 706 does not return the physical volume to pool M 704 (or any other pool) because the "return borrowed physical volume to scratch pool" flag 306 for pool N 706 is permanently assigned to "No". Hence, the empty physical volume is reused again and again in pool N 706.

In the VTS 100, the pool M 704 is the scratch pool 120a. Therefore, FIG. 7 illustrates a process where a physical volume is borrowed from a scratch pool to a pool, and used and reused in the pool without returning the physical volume to the scratch pool.

For managing storage pools borrow and return rules can be specified in multiple physical volume pool systems and the rules may encompass the assignment of physical volume to the various pools. A scratch pool may be maintained such that physical volumes may be shared among a plurality of active pools. When an active pool does not have any available physical volume, the active pool may borrow a physical volume from the scratch pool. Subsequently, after the active pool has used the physical volume and does not need the physical volume any further, the active pool may return the physical volume to the scratch pool. Data can be segregated into different storage pools. In addition, mechanisms for managing storage pools allow more efficient usage of physical volumes by allowing the sharing and reuse of physical volumes among a plurality of active pools.

Determining When to Borrow and Return Physical Volumes

An active pool is a pool that contains at least one physical volume that has been modified, i.e., new data has been written in the physical volume or existing data in the physical volume has been removed. At any instant of time, some data pools 120b . . . 120n may be pools that are not active. In certain implementations, the borrowing and returning of physical volumes are performed only by those data pools 120b . . . 120n that are active pools.

Figure 8:
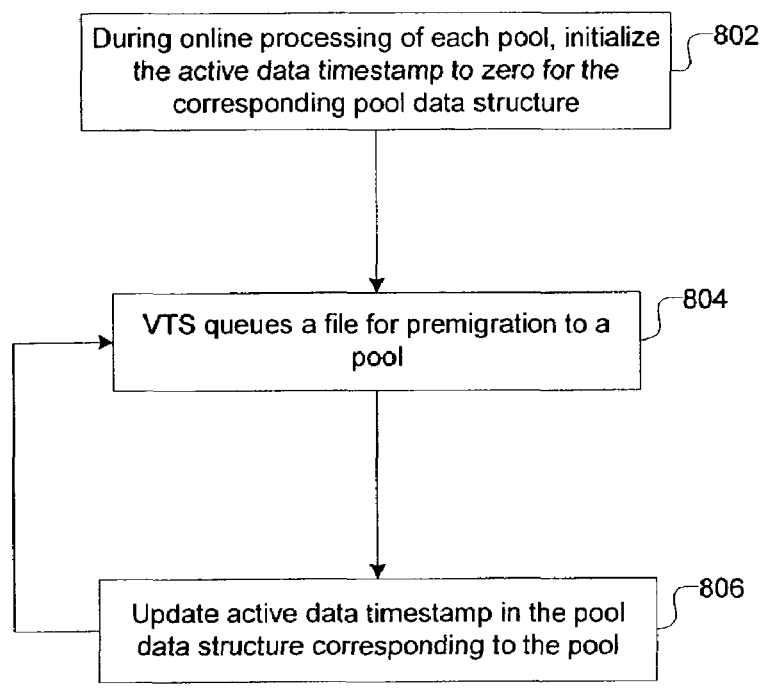
FIG. 8 illustrates logic for updating the active data timestamp in the pool data structure, in accordance with certain described implementations of the invention.

FIG. 8 illustrates logic for updating the "active data timestamp" field 308 in the pool data structure to facilitate the borrowing and returning of physical volumes, in accordance with certain described implementations of the invention. The logic may be performed by the physical volume monitor 132, the library manager 122, the VTS 100, or by any other process coupled to the VTS 100, such as the storage manager 105.

The process starts at block 802, where for each data pool 120b . . . 120n during online processing the "active data timestamp" field 308 for the pool data structure 126 is initialized to "zero." During online processing, each data pool is processed such that appropriate physical volumes are borrowed and returned for each data pool.

Control proceeds to block 804, where the VTS 100 queues a file for premigration to a selected pool 120b . . . 120n in the physical library 108. Thus, the time of last update of data in the selected pool 120b . . . 120n in the physical library 108 is the time at which the VTS 100 queues the file for premigration to the selected pool 120b . . . 120n. At block 806, the "active data timestamp" field 308 of the pool data structure 126 corresponding to the selected pool 120b . . . 120n is updated with the time at which the VTS queued the file for premigration. At the conclusion of block 806, the "active data timestamp" field 308 for a selected pool 120b . . . 120n contains the time at which data in the pool 120b . . . 120n was last updated. Control returns to block 804, and the logic of blocks 804 and 806 are repeated as the VTS 100 keeps queuing additional files for premigration.

Figure 9:
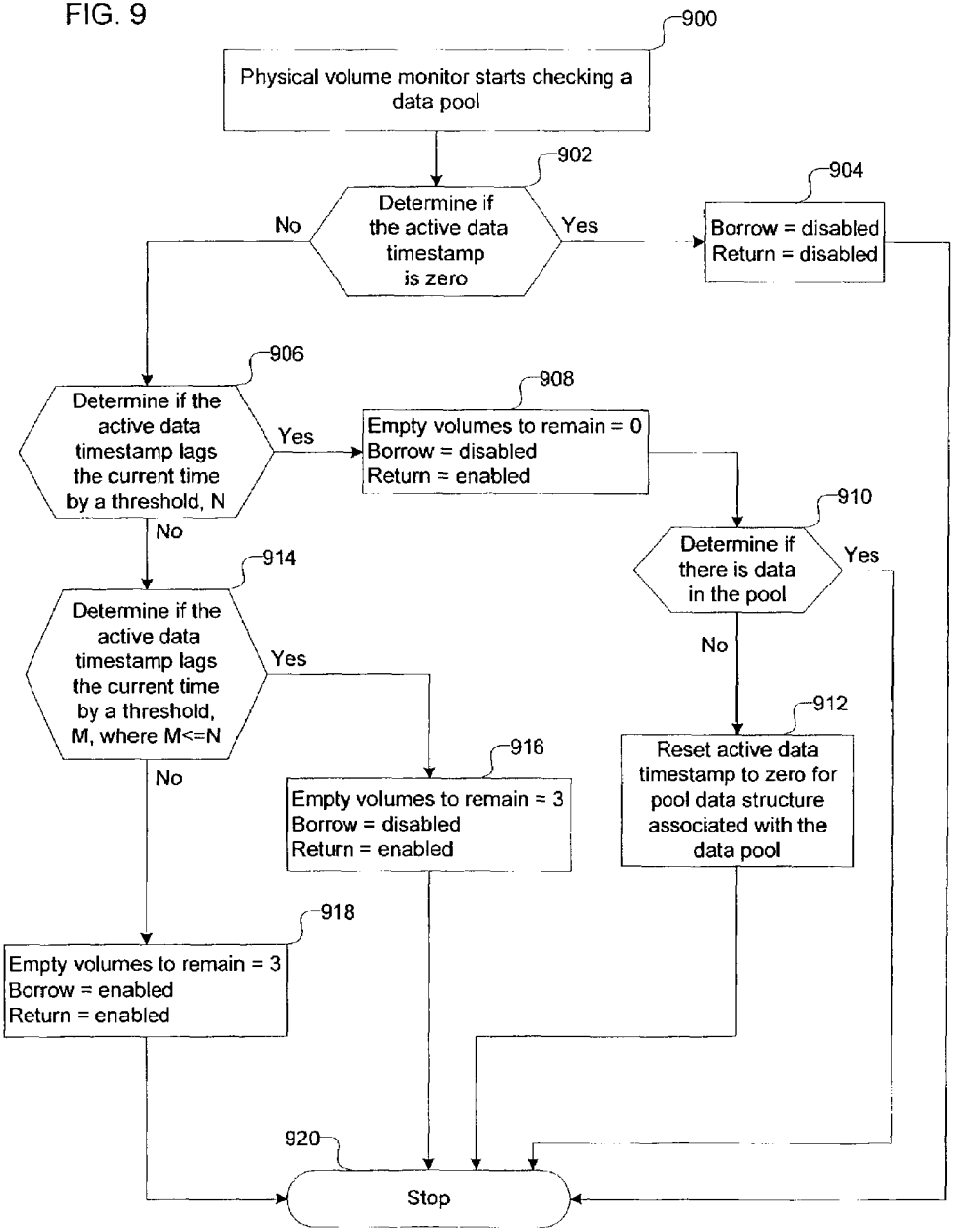
FIG. 9 illustrates logic for borrowing and returning physical volumes for a pool, in accordance with certain described implementations of the invention.

FIG. 9 illustrates logic for borrowing and returning physical volumes for a pool, in accordance with certain described implementations of the invention. The logic is performed by the physical volume monitor 132. In alternative implementations, the logic may be performed by the library manager 122, the VTS 100, or by any other process coupled to the VTS 100, such as the storage manager 105. The physical volume monitor 132 processes each data pool 120b . . . 120n such that each data pool 120b . . . 120n returns and borrows physical volumes according to the logic illustrated in FIG. 9.

The logic starts at block 900, where the physical volume monitor 132 starts checking a selected data pool 120b . . . 120n for return and borrow processing. Control proceeds to block 902, where the physical volume monitor 132 determines if the "active data timestamp" field 308 corresponding to the pool data structure 126 of the selected data pool 120b . . . 120n is "zero". If so, no change in data has taken place in the selected data pool 120b . . . 120n since the last online processing (i.e., return and borrow processing). Therefore, no borrowing from the scratch pool 120a or returning to the scratch pool 120a is needed. Control proceeds to block 904, where the physical volume monitor 132 disables borrowing and returning for the selected data pool 120*b* . . . 120*n* and the process stops (at block 920) for the selected data pool 120*b* . . . 120*n*.

If at block 902, the physical volume monitor 132 determines that the "active data timestamp" field 308 corresponding to the pool data structure 126 of the selected data pool 120*b* . . . 120*n* is not "zero" then control proceeds to block 906. At block 906, the physical volume monitor 132 determines if the "active data timestamp" field 308 lags the current time by more than a threshold time, N. In certain implementations, N is set to "72 hours", i.e., block 906 determines if the "active data timestamp" field 308 is more than 72 hours behind the current time.

If at block 906, the "active data timestamp" field 308 lags the current time by greater than the threshold, N, then control proceeds to block 908 where the physical volume monitor 132 sets the number of empty physical volumes to remain in the selected data pool 120*b* . . . 120*n* to zero, disables the borrowing of empty physical volumes for the selected data pool 120*b* . . . 120*n*, and enables the returning of physical volumes from the selected data pool 120*b* . . . 120*n* to the scratch pool 120*a*. The rationale for these settings are as follows. The selected data pool 120*b* . . . 120*n* has not been active for an extended period of time N. The likelihood (when compared to other data pools) of the selected data pool needing an empty physical volume is low. Therefore, by restricting borrowing more physical volumes are freed up in the scratch pool 120*a*. Returning is enabled because if data expires in the selected data pool 120*b* . . . 120*n*, physical volumes should be returned to the scratch pool 120*a*. Since the likelihood of an update in the selected data pool 120*b* . . . 120*n* is low, there is no need to retain any empty volumes in the selected data pool 120*b* . . . 120*n*.

Control proceeds to block 910 where the physical volume monitor 132 determines if there is data in the selected data pool 120*b* . . . 120*n*. If so, control proceeds to block 920 where the process stops.

If at block 910, the physical volume monitor 132 determines that there is no data in the selected data pool 120*b* . . . 120*n* then control proceeds to block 912 where the physical volume monitor 132 resets the "active data timestamp" field 308 of the selected data pool 120*b* . . . 120*n* to "zero". The sequence of blocks 900, 902, 906, 908, 910 and 912 may ensure the return of empty physical volumes in a selected data pool 120*b* . . . 120*n* to the scratch pool 120*a* and resets the "active data timestamp" 308 of the selected data pool 120*b* . . . 120*n* to "zero".

If at block 906, the physical volume monitor 132 determines that the "active data timestamp" 308 does not lag the current time by greater than the threshold, N, control proceeds to block 914. At block 914, the physical volume monitor 132 determines if the "active data timestamp" field 308 lags the current time by a threshold, M, where M<=N. In certain implementations, M may be 48 hours when N is 72 hours. If so, control proceeds to block 916 where the physical volume monitor 132 sets the number of empty physical volumes to remain at three for the selected data pool 120*b* . . . 120*n*, disables borrowing for the selected data pool 120*b* . . . 120*n* and enables returning for the selected data pool 120*b* . . . 120*n*. The rationale for these settings are as follows. Although the selected pool 120*b* . . . 120*n* has been active at some time period between M and N (where M<=N), the selected pool 120*b* . . . 120*n* has been inactive for at least the period M. Therefore, the selected data pool 120*b* . . . 120*n* has been inactive in the recent past. Hence, by allowing up to three empty volumes to remain in the selected data pool 120*b* . . . 120*n* there is likely to be enough room for updates on the selected data pool and by restricting borrowing more physical volumes are freed up in the scratch pool 120*a*. Control proceeds to block 920 where the process stops.

If at block 914, the physical volume monitor 132 determines that the "active data timestamp" field 308 does not lag the current time by a threshold, M, where M<=N, control proceeds to block 918, where the selected data pools 120*b* . . . 120*n* may perform normal return and borrow processing as described in FIGS. 2, 5, 6 and 7. At block 918, the physical volume monitor 132 sets the number of empty physical volumes to remain to three for the selected pools 120*b* . . . 120*n* and enables both borrowing and returning for the selected pools 120*b* . . . 120*n*. The rationale for these settings are as follows. The selected data pool 120*b* . . . 120*n* has been active recently. Therefore, by allowing up to three empty volumes to remain in the selected data pool 120*b* . . . 120*n* there is likely to be a large enough buffer of empty physical volumes 114*a* . . . 114*n* for updates on the selected data pool and by enabling borrowing more physical volumes 114*a* . . . 114*n* can be borrowed from the scratch pool 120*a* as needed. At the conclusion of 918, control proceeds to block 920 where the process stops.

The implementations reduce the unnecessary borrowing and returning of physical volumes by adjusting the manner in which borrow and return processes are used with data pools. When a data pool has been inactive for an extended period of time, empty physical volumes from the inactive pool may be returned to the scratch pool and borrowing disabled for the data pool. When a data pool has been active recently, up to three physical volumes may be kept as a buffer for the data pool, and the data pool may borrow additional volumes from the scratch pool as needed. When a data pool has not been active recently but has not been inactive for an extended period of time, borrowing may be disabled for the data pool but the data pool may still be allowed to maintain a buffer of three empty physical volumes. Therefore, there is a decreased demand for empty physical volumes on the scratch pool and physical volumes are shared and reused more often by data pools in the entire system.

Return Processing of Storage Pools

When physical volumes are reused, it may be better to reuse physical volumes uniformly, i.e., all physical volumes are used for approximately the same amount of time. By reusing each physical volume for approximately the same amount of time, the possibility of errors in a particular physical volume through overuse is reduced. Certain implementations achieve substantially uniform utilization of the physical volumes by providing improved techniques for returning physical volumes to the scratch pool 120*a* after the physical volumes have been used and are empty.

Figure 10:
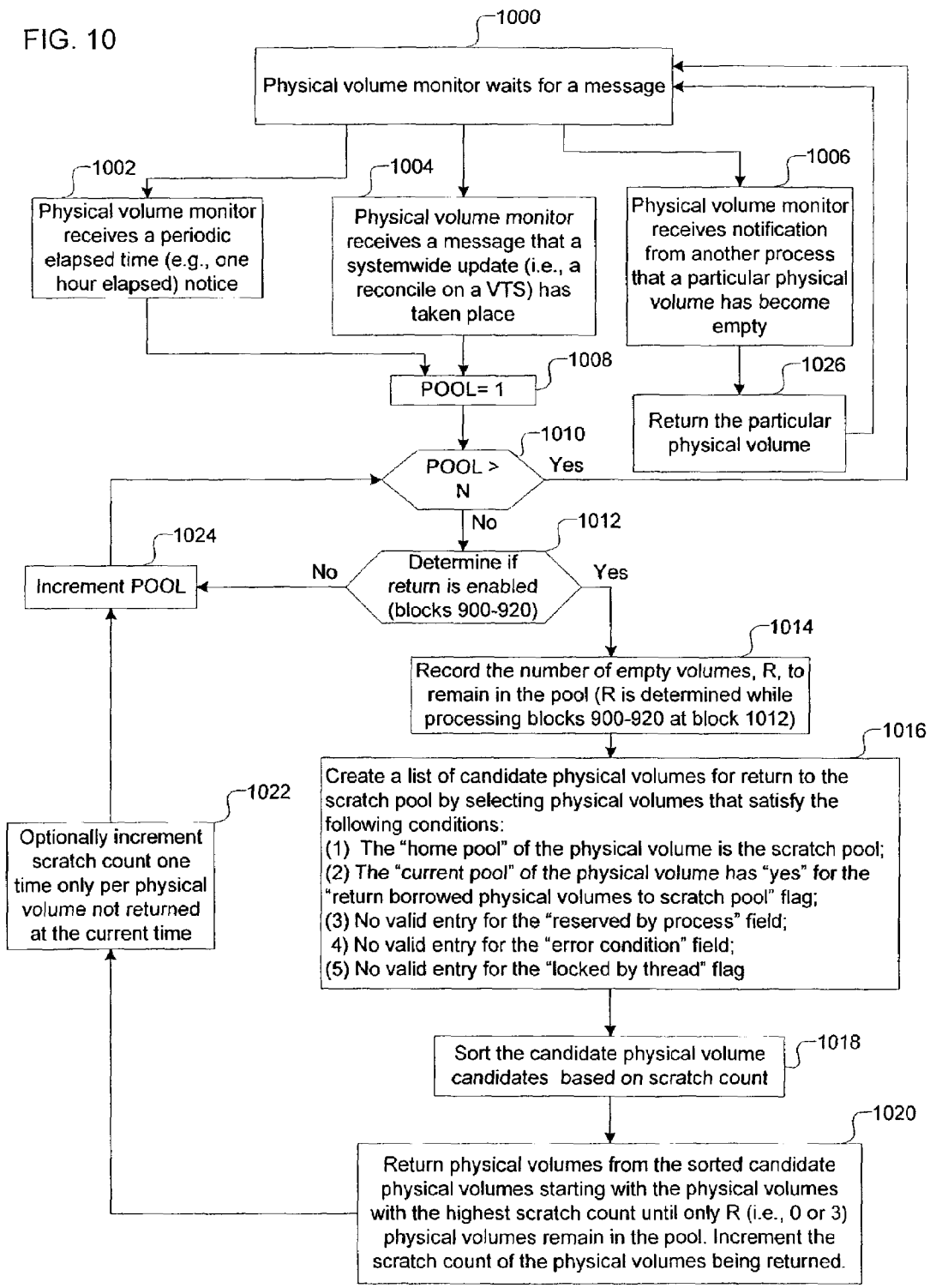
FIG. 10 illustrates logic for return processing of physical volumes, in accordance with certain described implementations of the invention.

FIG. 10 illustrates logic for return processing of physical volumes, in accordance with certain described implementations of the invention. The logic is performed by the physical volume monitor 132. In alternative implementations, the logic may be performed by the library manager 122, the VTS 100, or by any other process coupled to the VTS 100, such as the storage manager 105. The physical volume monitor 132 processes each data pool 120*b* . . . 120*n* such that each data pool 120*b* . . . 120*n* returns physical volumes to the scratch pool 120*a* according to the logic illustrated in FIG. 10.

The logic starts at block 1000, with the physical volume monitor 132 waiting for message. While the physical volume monitor 132 may perform additional functions, a particular thread of the physical volume monitor 132 may be dedicated towards waiting or the message that may potentially trigger the returning of physical volumes 114a ... 114n. Depending on the message, control may proceed to any of blocks 1002, 1004 and 1006. At block 1002 the physical volume monitor 132 receives a message that a certain fixed amount of time has elapsed. In certain implementations, such a message may be received every hour. At block 1004, the physical volume monitor 132 receives a message that a system wide update (i.e., a reconcile on the VTS 100) has taken place. A systemwide update involves reconciliation of all data in the VTS 100, the cache 106 and the physical library 108, such that the physical library 108 possesses the latest updated copy of all data. At block 1006, the physical volume monitor 132 receives a notification from another process that a particular physical volume has become empty.

From either of blocks 1002 or 1004 control proceeds to block 1008, where a variable "POOL" representing an index into the data pools 120b ... 120n is assigned the integer "one". The index indicates the selected data pool 120b ... 120n that is under return processing by the physical volume monitor 132. The total number of data pools 120b ... 120n is N and therefore a valid index into the data pools 120b ... 120n ranges from 1 to N.

Control proceeds to block 1010, where the physical volume monitor 132 determines whether the variable "POOL" is greater than N, where N is the total number of data pools 120b ... 120n. If so, control returns to block 1000 because all data pools 120b ... 120n have been processed for return processing. Otherwise, control proceeds to block 1012 where the physical volume monitor 132 may determine if returning of physical volumes is enabled for the data pool being currently processed by executing the logic described in FIG. 9 in blocks 900–920. In the process described in blocks 900–920 certain data pools had returning of physical volumes disabled and certain data pools had returning of physical volumes enabled based on the "active data timestamp" field 308 of the data pools. Furthermore, the process described in blocks 900–920 also determined the number of empty physical volumes R to retain. Hence at block 1012, as part of determining whether returning of physical volumes is enabled for the data pool being currently processed the number of empty physical volumes to retain is also determined. If at block 1012, it is determined that returning of physical volumes is enabled for the data pool being currently processed control proceeds to block 1014. At block 1014, the physical volume monitor 132 may record the number of empty physical volumes R to retain in the pool being currently processed (the number R was already determined while executing the logic of block 1012 as part of the processing of blocks 900–920).

Control proceeds to block 1016 where for each data pool the physical volume monitor 132 creates a list of candidate physical volumes for return to the scratch pool 120a. The candidate physical volumes are selected from the physical volumes 114a ... 114n, where each candidate physical volume satisfies the following five conditions. The first condition is that the "home pool" field 406 of a candidate physical volume is the scratch pool 120a (therefore, the candidate physical volume can be returned to the scratch pool 120a). The second condition is that the current pool of a candidate physical volume has "yes" for the "return borrowed physical volumes to scratch pool flag" field 306 (therefore, the current pool of the candidate physical volume allows return of the candidate physical volume to the scratch pool 120a). The third condition is that there is no valid entry for the "reserved by process" field 412 of the physical volume data structure 124 (therefore, the candidate physical volume is not reserved by any particular process). The fourth condition is that there is no valid entry for the "error condition" field 416 of the physical volume data structure 124 (therefore, there is no error condition associated with the candidate physical volume). The fifth condition is that there is no valid entry for the "locked by thread" field 414 (therefore, the candidate physical volume is not locked by any thread).

After the list of candidate physical volumes has been created in block 1016, control proceeds to block 1018 where the candidate physical volumes are sorted based on the "scratch count" 408 of each physical volume. The "scratch count" field 408 indicates the number of the times a physical volume 114a ... 114n has been borrowed and used. The value in the "scratch count" field 408 for a particular physical volume is an indicator of the total number of times the particular physical volume has been used since the physical volume 114a ... 114n was new. Therefore, the sorted list of candidate physical volumes reflects the relative frequency of prior usage of the candidate physical volumes.

Control proceeds to block 1020, where for each data pool 120b ... 120n the physical volume monitor 132 returns physical volumes from the sorted candidate physical volumes starting with the physical volume with the highest scratch count until only R physical volumes remain in each data pool 120b ... 120n. As determined in block 1014, R may be zero or three depending on the number of physical volumes R to retain in the data pool being processed. Note that the logic of blocks 900–920 restricted R to be either zero or three. The physical volumes are returned to the scratch pool 120a.

Leaving three physical volumes in each data pool 120b ... 120n ensures that even if the storage manager 105 starts using an empty physical volume in a data pool 120b ... 120n while the logic of FIG. 10 is being executed, there would still be at least two empty physical volumes in each data pool 120a ... 120n when the logic of FIG. 10 has completed execution. Having at least three empty physical volumes in each data pool ensures a buffer of physical volumes to reduce repeated borrowing of physical volumes from the scratch pool 120a. In alternative implementations, the number of physical volumes left in each data pool 120b ... 120n may be less than or greater than three. In still further implementations, different data pools 120b ... 120n may have a different number of physical volumes left after the completion of the logic of block 1020. In certain situations where R is zero, no physical volume is left in the data pool being processed as the data pool has been inactive too long.

At the conclusion of block 1020, control proceeds to block 1022 where the physical volume monitor 132 optionally increments the "scratch count" field 408 of the physical volumes not returned to the scratch pool 120a in block 1020. In alternative implementations, the "scratch count" field 408 may be incremented elsewhere.

Control proceeds to block 1024, where the physical volume monitor 132 increments the "POOL" variable so that the next pool from the data pool 120b ... 120n may be considered for return processing. Control returns to block 1010 where the next data pool 120b ... 120n is considered for return processing.

If at block 1012, the physical volume monitor 132 determines that the returning of data pools is disabled then control proceeds to block 1024. Also, at the conclusion of block 1006, control proceeds to block 1026 where the particular physical volume that became empty in block 1006 is returned to the scratch pool 120a. At block 1016 only one physical volume is returned to the scratch pool 120a. Control returns to block 1000.

Return processing achieves substantially uniform utilization of the physical volumes by providing improved techniques for returning physical volumes to the scratch pool 120a after the physical volumes have been used and are empty. In certain implementations of return processing, at least three empty physical volumes that have been used the least are left in each storage pool. Certain implementations of return processing also reduce the unnecessary borrowing and returning of physical volumes by limiting the borrow and return processes to be used with recently active pools. Furthermore, when a pool has been inactive for an extended period of time, empty physical volumes from the inactive pool may be returned to the scratch pool. Therefore, physical volumes are shared and reused more often by data pools and are used substantially uniformly.

Borrow Processing of Storage Pools

To ensure processing of information in a data storage pool 120b . . . 120n, the data storage pool 120b . . . 120n may contain a reserve of empty physical volumes. The physical volume monitor 132 may manage the borrowing of physical volumes 114a . . . 114n into the data storage pools 120b . . . 120n to help ensure that each data storage pool 120b . . . 120n has an adequate number of empty physical volumes. In certain implementations, the empty physical volumes are borrowed from the scratch pool 120a.

A small reserve of empty physical volumes in a data pool 120b . . . 120n ensures that when additional updates to the data pool 120b . . . 120n require additional storage space, such additional storage space is available on the empty physical volumes that have already been borrowed into the data pool 120b . . . 120n. If such empty physical volumes had not already been borrowed, additional time may have to be spent to borrow empty physical volumes from the scratch pool 120a when updates are made to a data storage pool 120b . . . 120n. During borrow processing, the physical volume monitor 132 borrows an adequate number of empty physical volumes 114a . . . 114n into data pools 120b . . . 120n by anticipating the requirement for the empty physical volumes 114a . . . 114n in the data storage pools 120b . . . 120n.

Figure 11:
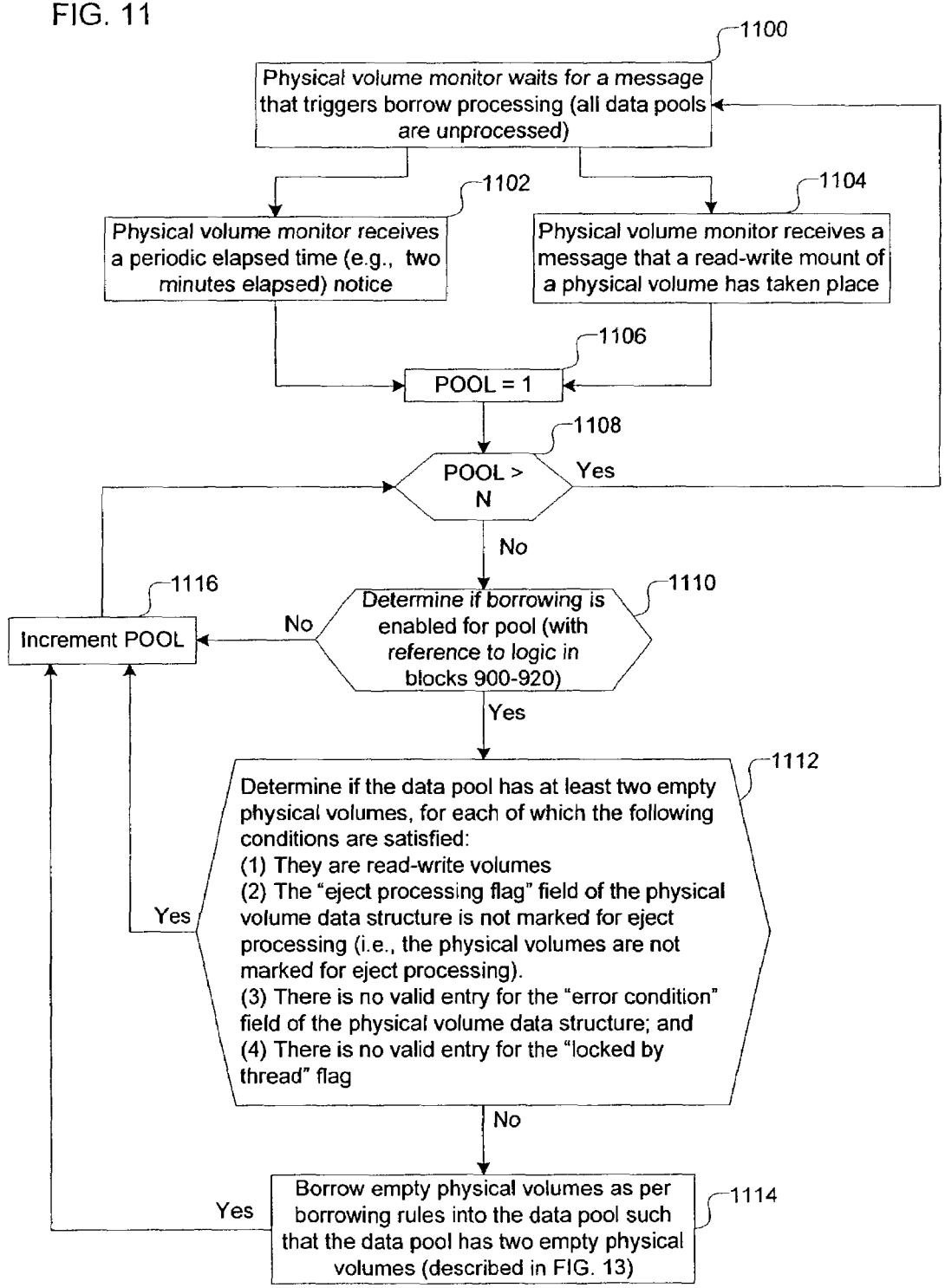
FIG. 11 illustrates logic for borrow processing of physical volumes, in accordance with certain described implementations of the invention.

FIG. 11 illustrates logic for borrow processing of physical volumes, in accordance with certain implementations of the invention. The logic is performed by the physical volume monitor 132. In alternative implementations, the logic maybe performed by the library manager 122, the VTS 100, or by any other process coupled to the VTS 100, such as the storage manager 105. The physical volume monitor 132 processes each data pool 120b . . . 120n such that each data pool 120b . . . 120n borrows physical volumes from the scratch pool 120a according to the logic illustrated in FIG. 11.

Processing starts at block 1100 with the physical volume monitor 132 waiting for a message that may potentially trigger the borrowing of physical volumes 114a . . . 114n from the scratch pool 120a. While the physical volume monitor 132 may perform additional functions, a particular thread of the physical volume monitor 132 may be dedicated towards waiting for the message that may potentially trigger the borrowing of physical volumes 114a . . . 114n. At block 1100, all data pools 120b . . . 120n are also marked as "unprocessed for borrowing" by the physical volume monitor 132.

At the completion of the logic described in block 1100, control may proceed to either block 1102 or 1104. At block 1102 the physical volume monitor 132 receives a message that indicates that a certain fixed amount of time has elapsed since the receipt of the last such message. In certain implementations, such a message may be received by the physical volume monitor 132 every two minutes. At block 1104 the physical volume monitor 132 receives a message that indicates that a read-write mount of a physical volume 114a . . . 114n has taken place.

From either of blocks 1102 or 1104 control proceeds to block 1106, where a variable "POOL" representing an index into the data pools 120b . . . 120n is assigned the integer "one". The index indicates a selected data pool 120b . . . 120n that is under borrow processing by the physical volume monitor 132. The total number of data pools 120b . . . 120n is N and therefore a valid index into the data pools 120b . . . 120n ranges from 1 to N.

Control proceeds to block 1108, where the physical volume monitor 132 determines whether the variable "POOL" is greater than N, where N is the total number of data pools 120b . . . 120n. If so, control returns to block 1100 because all data pools 120b . . . 120n have been processed for return processing. Otherwise, control proceeds to block 1110, where the physical volume monitor 132 determines if borrowing is enabled for the selected data pool (the logic of block 900–920 may have disabled certain data pools 120b . . . 120n for borrowing). If borrowing is not enabled for the selected data pool then borrow processing should not be performed for the selected data pool and control proceeds to block 1116 where the variable "POOL" is incremented (i.e., the next data pool 120b . . . 120n is selected for potential borrow processing). Control returns to block 1108.

If at block 1110, the physical volume monitor 132 determines that borrowing is enabled for the selected data pool then control proceeds to block 1112 where the physical volume monitor 132 determines if the selected data pool has at least two empty physical volumes, for each of which the following four conditions are satisfied. The first condition is that the at least two empty physical volumes are read-write volumes, i.e., data can be read from the physical volumes and written into the physical volumes. The second condition is that the "eject processing flag" field 418 of the physical volume data structure 124 is not marked for eject processing (i.e., the at least two empty physical volumes are not marked for eject processing). The third condition is that there is no valid entry for the "error condition" field 416 of the physical volume data structure 124 (therefore, there is no error condition associated with the at least two empty physical volumes). The fourth condition is that there is no valid entry for the "locked by thread" field 414 (therefore, the at least two empty physical volumes are not locked by any thread).

If at block 1112 it is determined that the data pool does not have least two empty physical volumes that satisfy the four conditions control proceeds to block 1114. At block 1114, the physical volume monitor 132 borrows empty physical volumes as per certain borrowing rules (the borrowing rules will be described in FIGS. 12 and 13) into the selected data pool such that at the completion of block 1114 the data pool has two empty physical volumes. Further details of the borrowing techniques used in block 1114 will be described in FIG. 13. Therefore, if the data pool does not have any empty physical volume that satisfy the four conditions then the data pool borrows two empty physical volumes from the scratch pool 120a. If the data pool has one empty physical volume that satisfies the four conditions, then the data pool borrows one empty physical volume from the scratch pool 120a. Control proceeds to block 1116.

If at block 1112 the physical volume monitor 132 determines that the data pool has at least two empty physical volumes then control proceeds to block 1116 because there is no need to borrow any additional empty physical volume to the data pool.

The logic of FIG. 11 ensures that each data pool 120b . . . 120n has at least two empty physical volumes thereby ensuring that when additional updates to the data pool 120b . . . 120n require additional storage space such additional storage space is available on the at least two empty physical volumes that have already been borrowed into the data pool 120b . . . 120n.

FIG. 12 illustrates details of the borrowing policy table 134 that indicates borrowing policies that may be applied to borrow physical volumes 114a . . . 114n, in accordance with certain implementations of the invention. The borrowing policy table 134 contains rules that are used by the physical volume monitor 132 to determine which physical volumes 114a . . . 114n to borrow from a scratch pool 120a into a data pool 120b . . . 120n.

In certain implementations there are two different types of physical volumes 114a . . . 114n. The two different types of physical volumes are of the "J" media type and the "K" media type. Physical volumes 114a . . . 114n that are borrowed from the scratch pool 120a may be borrowed according to certain borrowing policies. The "first media choice for borrow" field 302 and the "second media choice for borrow" field 304 in the pool data structure 126 corresponding to a data pool 120b . . . 120n may be used in association with the borrowing policy table 134 to determine what type of physical volume to borrow into a data pool 120b . . . 120n. The "first media choice for borrow" field 302 and the "second media choice for borrow" field 304 can be set to one of four values indicating the media type that the corresponding data pool may borrow. The four values are (1) "J" media type; (2) "K" media type; (3) "either media type"; and (4) "none". The borrowing policy table illustrates six combinations 1202, 1204, 1206, 1208, 1210, 1212 of the settings of the "first media choice for borrow" field 302 and the "second media choice for borrow" field 304 that are meaningful. The borrowing policy table 134 shows these six combinations 1202, 1204, 1206, 1208, 1210, 1212 with entries for the "first media type to borrow" 1214, the "second media type to borrow" 1216, the "interpretation" 1218 and the and the "precedence for borrowing" 1220 corresponding to each of the six combinations 1202, 1204, 1206, 1208, 1210, 1212. In the "precedence for borrowing" 1216 entries with a lower numeric value indicate a higher precedence for borrowing, i.e., "1" has the highest precedence and "3" the lowest precedence. In the borrowing policy table 132 the entries for the "first media type to borrow" 1214, the "second media type to borrow" 1216, and the "interpretation" 1218 are shown to facilitate the description of implementations and these entries may be omitted in the borrowing policy table 134 in the implementations.

As an example of the entries in the borrowing policy table 134, for the borrowing case "J–K" 1206 the "first media type to borrow" 1214 is "J", the "second media type to borrow" 1216 is "K". The "interpretation" 1218 is that the second media type "K" is borrowed only when no media types of the first media type "J" are available in the scratch pool 120a. The "precedence of borrowing" 1220 is "2" for the borrowing case "J–K" 1206.

Figure 13:
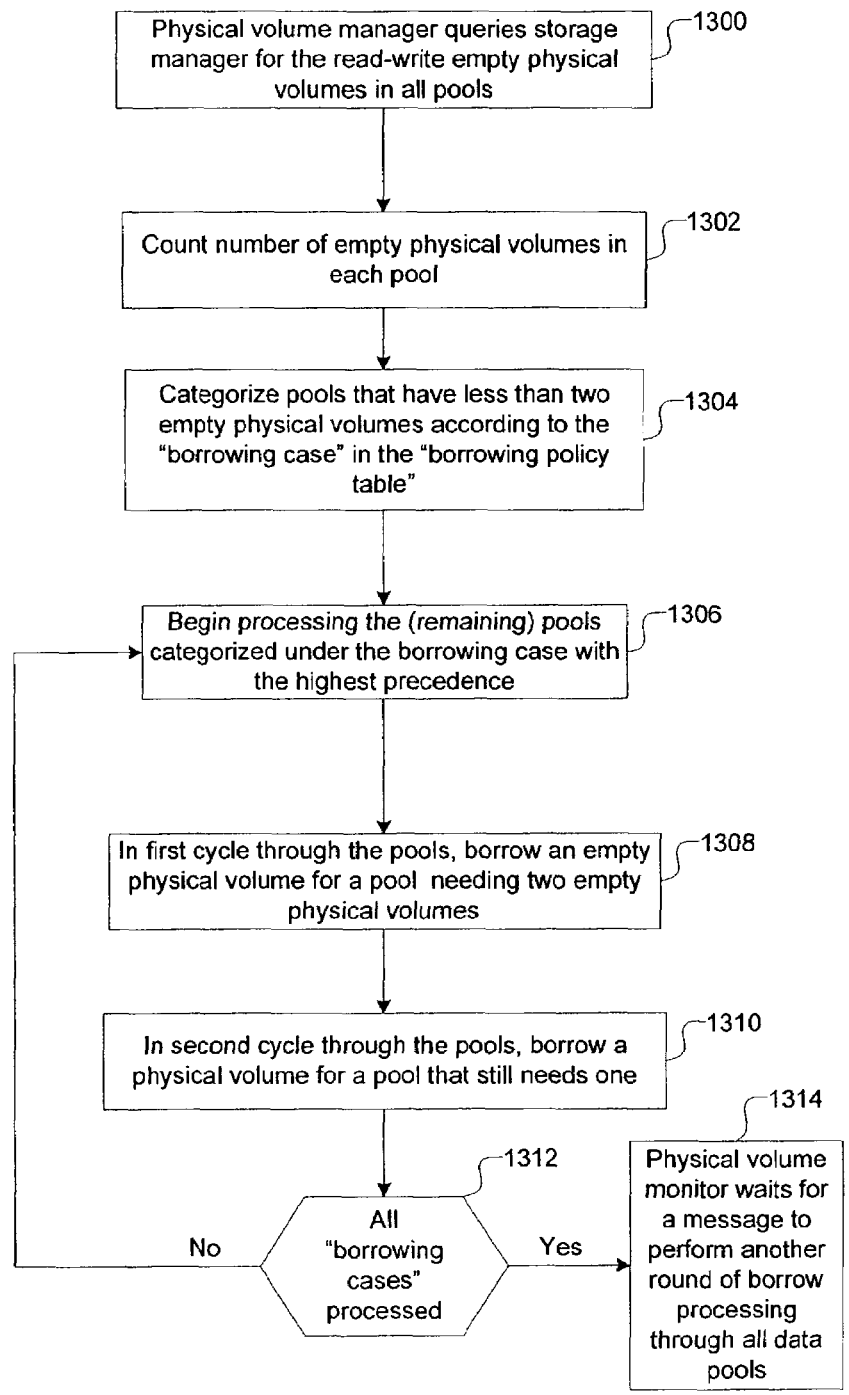
FIG. 13 illustrates logic for borrow processing of physical volumes based on certain borrowing policies, in accordance with certain described implementations of the invention.

FIG. 13 illustrates logic for borrow processing of physical volumes 114a . . . 114n based on the borrowing policy table 134, in accordance with certain implementations of the invention; The logic is performed by the physical volume monitor 132. In alternative implementations, the logic may be performed by the library manager 122, the VTS 100, or by any other process coupled to the VTS 100, such as the storage manager 105. The physical volume monitor 132 processes each data pool 120b . . . 120n such that each data pool 120b . . . 120n returns physical volumes to the scratch pool 120a according to the logic illustrated in FIG. 13.

Processing starts at block 1300 where the physical volume manager 132 queries the storage manager 105 for the empty physical volumes on which reads and writes can be performed in the data pools 120b . . . 120n. Control proceeds to block 1302 where the physical volume monitor 132 counts the number of such empty physical volumes in each data pool 120b . . . 120n based on the response from the storage manager 105. In alternative implementations, the physical volume monitor 132 may determine the number of empty physical volumes 132 on which reads and writes can be performed without the assistance of the storage manager 105.

Control proceeds to block 1304 where the physical volume monitor 132 categorizes the data pools 120b . . . 120n that have less than two empty physical volumes into one of the six borrowing cases 1202, 1204, 1206, 1208, 1210, 1212 of the borrowing policy table 134. The physical volume monitor 132 performs the categorization of each data pool based on the "first media choice for borrow" 302 field and the "second media choice for borrow" field 304 of the pool data structure 126 corresponding to each data pool. For example, if for a data pool the "first media choice for borrow" 302 field is "J" and the "second media choice for borrow" filed 304 is "K" then the data pool is categorized under the borrowing case "J–K" 1206.

At the conclusion of the logic of block 1304, all data pools that have less than two empty physical volumes are part of one of the six borrowing cases 1202, 1204, 1206, 1208, 1210, 1212. For example, physical volumes 114c, 114d, 114e, 114g may all be categorized under the borrowing case "K–J" 1208.

Control proceeds to block 1306 where the physical volume monitor 132 begins processing the data pools categorized under the borrowing case with the highest precedence. Control proceeds to block 1308, where a first cycle is made through the data pools categorized under the borrowing case to select the data pools that have no empty physical volumes. For the data pools with no empty physical volumes, the physical volume monitor 132 borrows one physical volume 114a . . . 114n of an appropriate media type according to the borrowing rules laid down in the borrowing policy table 134 for the borrowing case of the data pools being processed. If there is more than one physical volume of the appropriate media type that can be borrowed from the scratch pool 120a, the physical volume with the lowest "scratch count" 408 is borrowed, i.e., while borrowing the least used physical volumes are borrowed thereby providing substantially uniform usage of all physical volumes. At the conclusion of block 1308, all data pools that started block 1308 with no empty physical volume have one empty physical volume and all data pools that started block 1308 with one empty physical volume has one empty physical volume.

Control proceeds to block 1310, where in a second cycle through the data pools categorized under the borrowing case the physical volume monitor 132 borrows one physical volume 114a . . . 114n of an appropriate media type according to the borrowing rules laid down in the borrowing policy table 134 for the borrowing case of the data pools being processed that still need empty physical volumes. If there is more than one physical volume of the appropriate media type that can be borrowed from the scratch pool 120*a*, the physical volume with the lowest "scratch count" 408 is borrowed. The conclusion of block 1310 completes the processing of data pools categorized for one borrowing case.

The advantage of borrowing empty physical volumes in two cycles is that in the first cycle only data pools with no empty physical volumes borrow one empty physical volume. Only when each data pool has at least one empty physical volume can the data pools attempt to borrow a second physical volume. Having two cycles is advantageous in situations where the scratch pool 120*a* runs out of physical volumes of a particular type.

Control proceeds to block 1312 where the physical volume monitor 132 determines whether data pools corresponding to all borrowing cases have been processed. If not, control returns to block 1306, where the physical volume monitor 132 begins processing the remaining unprocessed pools categorized under the borrowing case with the highest precedence. The loop formed by block 1306, 1308, 1310, 1312 maybe executed six times corresponding to the six borrowing cases 1202, 1204, 1206, 1208, 1210, 1212.

If at block 1312, a determination is made that data pools corresponding to all borrowing cases 1202, 1204, 1206, 1208, 1210, 1212 have been processed control proceeds to block 1314 where the physical volume monitor 132 waits for a message to perform another round of borrow processing through all data pools 120*b* . . . 120*n*.

In certain implementations of the invention, during the execution of the logic of FIG. 13 the scratch pool 120*a* may run out physical volumes of one media type. In such a case, borrowing is still performed for data pools that can borrow the other media type. Should the scratch pool 120*a* run out of both media types, borrow processing stops. The library manager 122 may be informed when the scratch pool 120*a* runs out of physical volumes of a particular media type. The logic of FIG. 8 ensures that physical volumes are borrowed from the scratch pool 120*a* according to the policies laid down in the borrowing policy table 134. An attempt is made to keep two empty physical volumes in data pool 120*b* . . . 120*n* by appropriate borrowing strategies.

Borrow processing ensures a small reserve of empty physical volumes for each data pool 120*b* . . . 120*n*. Physical volumes 114*a* . . . 114*n* are borrowed from the scratch pool 120*a* when a data pool 120*b* . . . 120*n* does not have at least two empty physical volumes. While borrowing, the least used physical volumes are borrowed from the scratch pool 120*a* thereby ensuring substantially uniform utilization of the data pools. Via the mechanisms of borrowing and returning the implementations of the invention maintain neither too few nor too many empty physical volumes in each data pool. Also, the combination of borrowing precedence and satisfying a first borrow for all pools followed by a second borrow for all pools ensures that a limited number of a specific media type is distributed fairly among those pools that most require that media type.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

Figure 14:
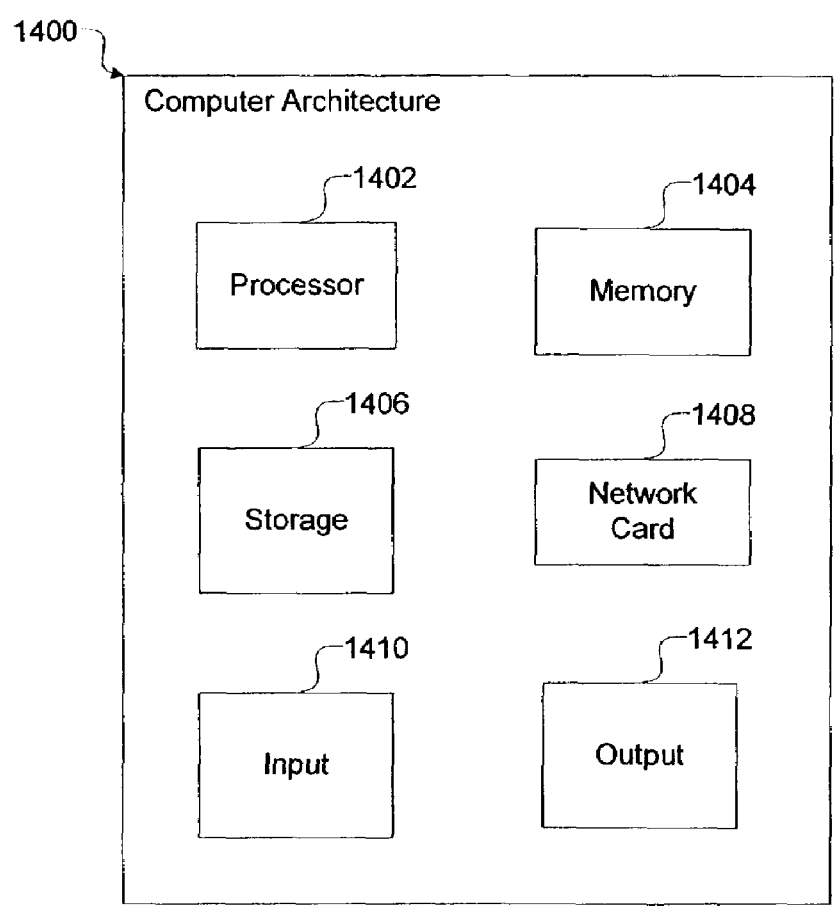
FIG. 14 illustrates a block diagram of a computer architecture in which certain described aspects of the invention are implemented.

FIG. 14 illustrates a block diagram of a computer architecture in which certain aspects of the invention are implemented. FIG. 14 illustrates one implementation of the VTS 100 and the hosts 102*a* . . . 102*n*. The VTS 100 and the hosts 102*a* . . . 102*n* may implement a computer architecture 1400 having a processor 1402 (e.g., a microprocessor, such as the CPU 104), a memory 1404 (e.g., a volatile memory device), and storage 1406 (e.g., a non-volatile storage, magnetic disk drives, optical disk drives, tape drives, etc.). The storage 1406 may comprise an internal storage device, an attached storage device or a network accessible storage device. Programs in the storage 1406 may be loaded into the memory 1404 and executed by the processor 1402 in a manner known in the art. The architecture may further include a network card 1408 to enable communication with a network. The architecture may also include at least one input 1410, such as a keyboard, a touchscreen, a pen, voice-activated input, etc., and at least one output 1412, such as a display device, a speaker, a printer, etc.

The logic of FIGS. 5–11 and 13 describe specific operations occurring in a particular order. Further, the operations may be performed in parallel as well as sequentially. In alternative implementations, certain of the logic operations may be performed in a different order, modified or removed and still implement implementations of the present invention. Morever, steps may be added to the above described logic and still conform to the implementations. Yet further steps maybe performed by a single process or distributed processes.

While the hosts 102*a* . . . 102*n* and the VTS 100 communicate within a client-server paradigm in the described implementations, the hosts 102*a* . . . 102*n* and the VTS 100 may also communicate within a peer-to-peer or any other paradigm known in the art. Furthermore, many of the software and hardware components have been described in separate modules for purposes of illustration. Such components may be integrated into a fewer number of components or divided into a larger number of components. Additionally, certain operations described as performed by a specific component may be performed by other components.

While implementations of the invention have been described with a scratch pool, alternative implementations may be constructed where active pools may borrow and return physical volumes among the active pools (without involving a scratch pool) to reuse and share physical volumes. Alternative implementations may also be constructed with more that one scratch pool. In alternative implementations, the functions of a scratch pool may be performed by an active pool.

The data structures shown in FIGS. 3 and 4 show the data structures as having specific types of information. In alternative implementations, the physical volume data structure 124 and the pool data structure 126 may have fewer, more or different fields than shown in the figures. The borrowing policy table 134 may also be constructed differently and may contain different information than shown in FIG. 12.

Certain groups of elements shown in the figures have been labeled with reference numerals having an identical numeric prefix followed by the suffix "a", the suffix "b", or the suffix "n". For example, the physical volumes are labeled 114*a*, 114*b*, . . . 114*n* and the logical volumes are labeled 116*a*, 116*b*, . . . 116*n*. Labeling groups of elements in such a manner does not imply that different groups of elements contain an identical number of elements in each group. For example, the number of physical volumes 114*a* . . . 114*n* need not be the same as the number of logical volumes 116*a* . . . 116*n*.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for return processing in storage pools, the method comprising:
   determining if a first storage pool has been updated within a first elapsed time period; and
   if the first storage pool has not been updated within the first elapsed time period:
   (i) setting a number of physical volumes to remain in the first storage pool to zero;
   (ii) disabling borrowing of physical volumes to the first storage pool from a second storage pool; and
   (iii) allowing returning of physical volumes from the first storage pool.

2. The method of claims further comprising:
   recording that the first storage pool has undergone the return of empty physical volumes based on time, wherein recording is made in a field coupled to the first storage pool, and wherein the field is also capable of recording update times of the first storage pool.

3. The method of claim 1, wherein the first storage pool is a data pool, wherein the second storage pool is a scratch pool, and wherein the first storage pool borrows at least one physical volume from the second storage pool.

4. The method of claim 1, wherein determining if the first storage pool has been undated within the first elapsed time period is made at periodic intervals by a monitor application that monitors the first storage pool and other storage pools.

5. The method of claim 1, further comprising:
   allowing normal returning and borrowing in the first storage pool if the first storage pool has been updated within a second elapsed time period, wherein the second elapsed time period is less than the first elapsed time period.

6. The method of claim 1, further comprising:
   determining if the first storage pool has been updated within a second elapsed time period, wherein the second elapsed time period is less than the first elapsed dine period; and
   if the first storage pool has not been updated within the second elapsed time period:
   (i) setting the number of physical volumes to remain in the first storage pool to three;
   (ii) disabling borrowing of physical volumes to the first storage pool from the second storage pool; and
   (iii) allowing returning of physical volumes from the first storage pool.

7. A system for return processing in storage pools, the system comprising:
   a first storage pool;
   a second storage pool;
   means for determining if the first storage pool has been updated within a first elapsed time period;
   means for setting the number of physical volumes to remain in the first storage pool to zero if the first storage pool has not been updated within the first elapsed time period;
   means for disabling borrowing of physical volumes to the first storage pool from the second storage pool if the first storage pool has not bean updated within the first elapsed time period; and
   means for allowing returning of physical volumes from the first storage pool if the first storage pool has not been updated within the first elapsed time period.

8. The system of claim 7, further comprising:
   means for recording that the first storage pool has undergone the return of empty physical volumes based on time, wherein recording is made in a field coupled to the first storage pool, and wherein the field is also capable of recording update times of the first storage pool.

9. The system of claim 7, wherein the first storage pool is a data pool, wherein the second storage pool is a scratch pool, and wherein the first storage pool borrows at least one physical volume from the second storage pool.

10. The system of claim 7, wherein the means for determining is a monitor application that monitors the first storage pool and the other storage pools, wherein the monitor application determines at periodic intervals if the first storage pool has been updated within the first elapsed time period.

11. The system of claim 7, further comprising:
    means for allowing normal returning and borrowing in the first storage pool if the first storage pool has been updated within a accond elapsed time period, wherein the second elapsed time period is less than the first elapsed time period.

12. The system of claim 7, further comprising:
    means for determining if the first storage pool has been updated within a second elapsed time period, wherein the second elapsed time period is less than the first elapsed time period;
    means for setting the number of physical volumes to remain in the first storage pool to three, if the first storage pool has not been updated within the second elapsed time period;
    means for disabling borrowing of physical volumes to the first storage pool from the second storage pool if the first storage pool has not been updated within the second elapsed time period; and means for allowing returning of physical volumes from the first storage pool if the first storage pool has not been updated within the second elapsed time period.

13. A computer readable medium including instructions for return processing in storage pools, wherein the instructions execute on a computer to cause operations, the operations comprising:
   determining if the first storage pool has been updated within a first elapsed time period; and
   if the first storage pool has not been updated within the first elapsed time period:
      (i) setting the number of physical volumes to remain in the first storage pool to zero;
      (ii) disabling borrowing of physical volumes to the first storage pool from a second storage pool; and
      (iii) allowing returning of physical volumes from the first storage pool.

14. The computer readable medium of claim 13, operations further comprising:
   recording that the first storage pool has undergone the return of empty physical volumes based on time, wherein recording is made in a field coupled to the first storage pool, and wherein the field is also capable of recording update times of the first storage pool.

15. The computer readable medium of claim 13, wherein the first storage pool is a data pool, wherein the second storage pool is a scratch pool, and wherein the first storage pool borrows at least one physical volume from the second storage pool.

16. The computer readable medium of claim 13, wherein determining if the first storage pool has been updated within the first elapsed time period is made at periodic intervals by a monitor application that monitors the first storage pool and other storage pools.

17. The computer readable medium of claim 13, the operations further comprising:
   allowing normal returning and borrowing in the first storage pool if the first storage pool has been updated within a second elapsed time period, wherein the second elapsed time period is less than the first elapsed time period.

18. The computer readable medium of claim 13, the operations further comprising:
   determining if the first storage pool has been updated within a second elapsed time period, wherein the second elapsed time period is less than the first elapsed time period; and
   if the first storage pool has not been updated within the second elapsed time period:
      (i) setting the number of physical volumes to remain in the first storage pool to three;
      (ii) disabling borrowing of physical volumes to the first storage pool from the second storage pool; and
      (iii) allowing returning of physical volumes from the first storage pool.

* * * * *

UNITED STATES PATENT AND TRADEMARK OFFICE
CERTIFICATE OF CORRECTION

| | |
|---|---|
| PATENT NO. | : 6,985,916 B2 |
| APPLICATION NO. | : 10/230522 |
| DATED | : January 10, 2006 |
| INVENTOR(S) | : Wayne Charles Carlson et al. |

It is certified that error appears in the above-identified patent and that said Letters Patent is hereby corrected as shown below:

Column 11, line 17, delete "step 708" and insert -- step A 708 -- .

Column 23, line 48, delete "of claims further" and insert -- of claim 1 further -- .
Line 59, delete "undated" and insert -- updated -- .

Column 24, line 5, delete "dine" and insert -- time -- .
Line 6, delete "updatcd" and insert -- updated -- .
Line 26, delete "not bean" and insert -- not been -- .
Line 44, delete "and the other" and insert -- and other -- .
Line 52, delete "accond" and insert -- second -- .

Signed and Sealed this

Twenty-second Day of May, 2007

JON W. DUDAS
*Director of the United States Patent and Trademark Office*